(12) United States Patent
Ghosh et al.

(10) Patent No.: US 12,333,602 B1
(45) Date of Patent: Jun. 17, 2025

(54) TOKENIZED STRUCTURED EXCHANGE TRACKING

(71) Applicant: Wells Fargo Bank, N.A., San Francisco, CA (US)

(72) Inventors: Debashis Ghosh, San Francisco, CA (US); Luiz Fernando Flor De Silva, Pleasant Hill, CA (US); Nathaniel C. Eutsler, San Francisco, CA (US); Matthew Mullin Shepherd, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 121 days.

(21) Appl. No.: 18/099,117

(22) Filed: Jan. 19, 2023

(51) Int. Cl.
*G06Q 40/04* (2012.01)
(52) U.S. Cl.
CPC ......... *G06Q 40/04* (2013.01); *G06Q 2220/16* (2013.01)
(58) Field of Classification Search
CPC ........... H04L 9/32; H04L 9/06; H04L 9/3247; G06Q 40/04
USPC ......................................................... 726/14
See application file for complete search history.

(56) References Cited

U.S. PATENT DOCUMENTS

| 11,228,436 B1 | 1/2022 | Foley et al. |
| 2021/0248214 A1 | 8/2021 | Goldston et al. |
| 2021/0281410 A1 | 9/2021 | Hain |
| 2022/0006642 A1 | 1/2022 | Maj et al. |
| 2022/0058639 A1 | 2/2022 | Lu et al. |
| 2022/0210061 A1 | 6/2022 | Simu et al. |
| 2022/0366022 A1* | 11/2022 | Goldston ................. G06F 21/64 |
| 2023/0087841 A1* | 3/2023 | Read ..................... H04L 9/3247 705/51 |
| 2023/0093520 A1 | 3/2023 | Young et al. |
| 2023/0119691 A1 | 4/2023 | Kurian et al. |
| 2023/0259923 A1* | 8/2023 | Conley .............. G06Q 20/3274 705/75 |
| 2023/0353355 A1* | 11/2023 | Meyers ................. G06F 21/335 |

OTHER PUBLICATIONS

"Can NFTs Increase Efficiency in Trade Finance," (Mar. 15, 2022), pp. 1-8.
Blueu, Walter, "Global Trade Finance and the XDC Network," (Jan. 12, 2022), pp. 1-11.
Winstantpay, "Accelerating trade with NFTs for LCs," (Aug. 12, 2021), pp. 1-2.

* cited by examiner

*Primary Examiner* — Teshome Hailu
(74) *Attorney, Agent, or Firm* — Foley & Lardner LLP

(57) ABSTRACT

A method includes receiving a protection request for an exchange and generating a metadata object including a plurality of outputting attributes for outputting. The method further includes generating a protected NFT including a link with the metadata object. The protected NFT is encapsulated within a control structure that restricts an output of the metadata object. The method further includes signing the protected NFT using at least one of a first private key or a second public key. The method further includes transmitting the signed protected NFT to the remote device and continuously monitoring the exchange. The method further includes detecting, by the control structure, at least one outputting attribute of the plurality of outputting attributes is satisfied and, in response to detecting the at least one outputting attribute is satisfied, outputting at least a portion of the output.

27 Claims, 6 Drawing Sheets

Fig. 6

TOKENIZED STRUCTURED EXCHANGE TRACKING

TECHNICAL FIELD

The present implementations relate generally to assets, and more particularly to asset exchange tracking.

INTRODUCTION

The present disclosure relates generally to assets, and more particularly to asset exchange protection. In a computer networked environment such as the internet, users and entities such as people or companies exchange both physical and digital assets.

SUMMARY

Some arrangements relate to a system to protect asset exchanges utilizing non-fungible tokens (NFTs). The system includes a data processing system including memory and one or more processors to receive a protection request for an exchange, generate a metadata object including metadata of the exchange and a plurality of outputting attributes for outputting an output of the metadata object, generate, based on the metadata object, a protected NFT including a link with the metadata object, wherein the protected NFT is encapsulated within a control structure that restricts the output of the metadata object to a remote device remote from the one or more processors, generate a first public and private key pair including a first public key and a first private key, sign the protected NFT using at least one of the first private key or a second public key, wherein the second public key is transmitted to the data processing system by the remote device, transmit the signed protected NFT to the remote device, continuously monitor the exchange based on collecting off-chain data from one or more off-chain data feeds, detect, by the control structure, at least one outputting attribute of the plurality of outputting attributes is satisfied based on the off-chain data, and, in response to detecting the at least one outputting attribute is satisfied, output at least a portion of the output of the metadata object to the remote device.

In some arrangements, the one or more processors further receive, from the remote device, a security token, compare the security token to a recorded security token stored in the metadata object of the exchange, and, in response to the security token matching the recorded security token, authorizing a user of the remote device to access at least a portion of the protected NFT via the remote device, wherein the security token is a security NFT and the recorded security token is a recorded security NFT.

In some arrangements, the metadata object further includes a plurality of output preventing attributes for preventing output. The one or more processors further detect, by the control structure, at least one output preventing attribute of the plurality of output preventing attributes is satisfied based on the off-chain data, and, in response to detecting the at least one output preventing attribute is satisfied, prevent outputting the output of the metadata object to the remote device.

In some arrangements, the at least one of the plurality of output preventing attributes includes a user identifier of a user of the remote device matching a blacklisted user identifier, the blacklisted user identifier identifying a blacklisted user with a fraudulent exchange history, or a location of the user, determined via a location of the remote device, matching a blacklisted location, the blacklisted location identifying a sanctioned location.

In some arrangements, the protection request for the exchange is received from a customer, via a customer device, in response to the customer exchanging for at least one of services or goods from a provider, the provider being a user of the remote device.

In some arrangements, the metadata object further includes a plurality of burning attributes for burning the protected NFT. The one or more processors further detect, by the control structure, at least one burning attribute of the plurality of burning attributes is satisfied based on the off-chain data, and, in response to detecting the at least one burning attribute is satisfied, retrieve the protected NFT from the remote device and burn the protected NFT, wherein burning the protected NFT comprises transmitting the protected NFT to an un-spendable address of a digital wallet.

In some arrangements, the metadata object further includes a plurality of minting attributes for minting a new protected NFT. The at least one burning attribute is associated with at least one minting attribute. The one or more processors further, in response to burning the protected NFT, generate a new metadata object comprising new metadata of the exchange and a plurality of new outputting attributes for outputting, generate, based on the new metadata object, the new protected NFT comprising a new link with the new metadata object, wherein the new protected NFT is encapsulated within a new control structure that restricts an output of the new metadata object to the remote device, sign the new protected NFT using at least one of the first private key or the second public key, and transmit the signed new protected NFT to the remote device.

In some arrangements, the at least one outputting attribute comprises a period of time passing, wherein the period of time starts in response to transmitting the protected NFT to the remote device.

In some arrangements, the at least one outputting attribute comprises a dynamic attribute, the dynamic attribute configured to change based on at least a portion of the off-chain data, wherein the at least the portion of the off-chain data comprises one or more of weather conditions, trade regulations, pandemics, natural disasters, political unrest, or shipping route disruptions.

In some arrangements, the one or more processors further, in response to outputting the output of the metadata object to the remote device, receive the protected NFT from the remote device, wherein the remote device is a first remote device associated with a provider, and, in response to receiving the protected NFT, transmitting the protected NFT to a second remote device associated with a customer.

In some arrangements, the one or more processors further receive the protected NFT from the remote device, and, in response to receiving the protected NFT, authorize outputting the output of the metadata object to the remote device.

In some arrangements, the metadata object further includes a plurality of output reversing attributes for reversing output. Outputting the at least the portion of the output of the metadata object to the remote device comprises transmitting the at least the portion of the output of the metadata object to a shared digital wallet of the remote device, the shared digital wallet accessible via the remote device and the data processing system. The one or more processors further detect, by the control structure, at least one output reversing attribute of the plurality of output reversing attributes is satisfied based on the off-chain data, and, in response to detecting the at least one output reversing attribute is satisfied, retrieving the at least the portion of the output of the metadata object from the shared digital wallet.

In some arrangements, the protected NFT is stored on a first blockchain network. The one or more processors further receive a network transfer request to transfer the protected NFT to a second blockchain network, and, in response to receiving the network transfer request, transfer the protected NFT from the first blockchain network to the second blockchain network. Transferring the protected NFT includes receiving, by the one or more processors, a signed exchange request signed by a second private key, wherein a second public and private key pair comprises the second public key and the second private key, the second public and private key pair being associated with the protected NFT on the first blockchain network, providing, by the one or more processors to the second blockchain network, the second public key based on interfacing with a destination address of the second blockchain network via a first application programming interface (API), determining, by the one or more processors from the second blockchain network, the signed exchange request was verified, and, in response to determining that the signed exchange request was verified, updating, by the one or more processors, the first blockchain network by removing the second public and private key pair.

In some arrangements, the exchange includes a physical asset, and each of the plurality of outputting attributes are a geographic location on a proposed route of the physical asset.

In some arrangements, the output of the metadata object comprises a fungible value, and wherein the fungible value is in a form of a digital currency, a digital form of a fiat currency, or a digital financial instrument for exchange.

In some arrangements, the at least one outputting attribute includes at least a portion of a first digital representation of the exchange matching at least a portion of a second digital representation of the exchange. The first digital representation is at least one of an image, a scannable code, a video, or data received from the remote device. The second digital representation is at least one of an image, a scannable code, a video, or data stored in the metadata of the exchange.

In some arrangements, matching the at least the portion of the first digital representation to the at least the portion of the second digital representation comprises analyzing the first digital representation based on collecting one or more content areas of the first digital representation and cross-referencing the one or more content areas with the second digital representation.

Some arrangements relate to a method to protect asset exchanges utilizing non-fungible tokens (NFTs). The method includes receiving, by one or more processors, a protection request for an exchange and generating, by the one or more processors, a metadata object including metadata of the exchange and a plurality of outputting attributes for outputting an output of the metadata object. The method further includes generating, by the one or more processors based on the metadata object, a protected NFT including a link with the metadata object, wherein the protected NFT is encapsulated within a control structure that restricts the output of the metadata object to a remote device remote from the one or more processors. The method further includes generating, by the one or more processors, a first public and private key pair including a first public key and a first private key and signing, by the one or more processors, the protected NFT using at least one of the first private key or a second public key, wherein the second public key is transmitted to the data processing system by the remote device. The method further includes transmitting, by the one or more processors, the signed protected NFT to the remote device, continuously monitoring, by the one or more processors, the exchange based on collecting off-chain data from one or more off-chain data feeds, detecting, by the control structure, at least one outputting attribute of the plurality of outputting attributes is satisfied based on the off-chain data, and, in response to detecting the at least one outputting attribute is satisfied, outputting, by the one or more processors, at least a portion of the output of the metadata object to the remote device.

In some arrangements, the method further includes receiving, by the one or more processors from the remote device, a security token, comparing, by the one or more processors, the security token to a recorded security token stored in the metadata object, and, in response to the security token matching the recorded security token, authorizing, by the one or more processors, a user of the remote device to access at least a portion of the protected NFT via the remote device. The security token is a security NFT and the recorded security token is a recorded security NFT.

Some arrangements relate to a non-transitory computer readable medium including one or more instructions stored thereon and executable by a processor to receive a protection request for an exchange, generate a metadata object including metadata of the exchange and a plurality of outputting attributes for outputting an output of the metadata object, generate, based on the metadata object, a protected NFT including a link with the metadata object, wherein the protected NFT is encapsulated within a control structure that restricts an output of the metadata object to a remote device remote from the one or more processors, generate a first public and private key pair including a first public key and a first private key, sign the protected NFT using at least one of the first private key or a second public key, wherein the second public key is transmitted to the data processing system by the remote device, transmit the signed protected NFT to the remote device, continuously monitor the exchange based on collecting off-chain data from one or more off-chain data feeds, detect, by the control structure, at least one outputting attribute of the plurality of outputting attributes is satisfied based on the off-chain data, and, in response to detecting the at least one outputting attribute is satisfied, output at least a portion of the output of the metadata object to the remote device.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 6 depicts an overlay ledger and a blockchain storage within the data processing system of FIG. 1, in accordance with present implementations.

DETAILED DESCRIPTION

Figure 1:
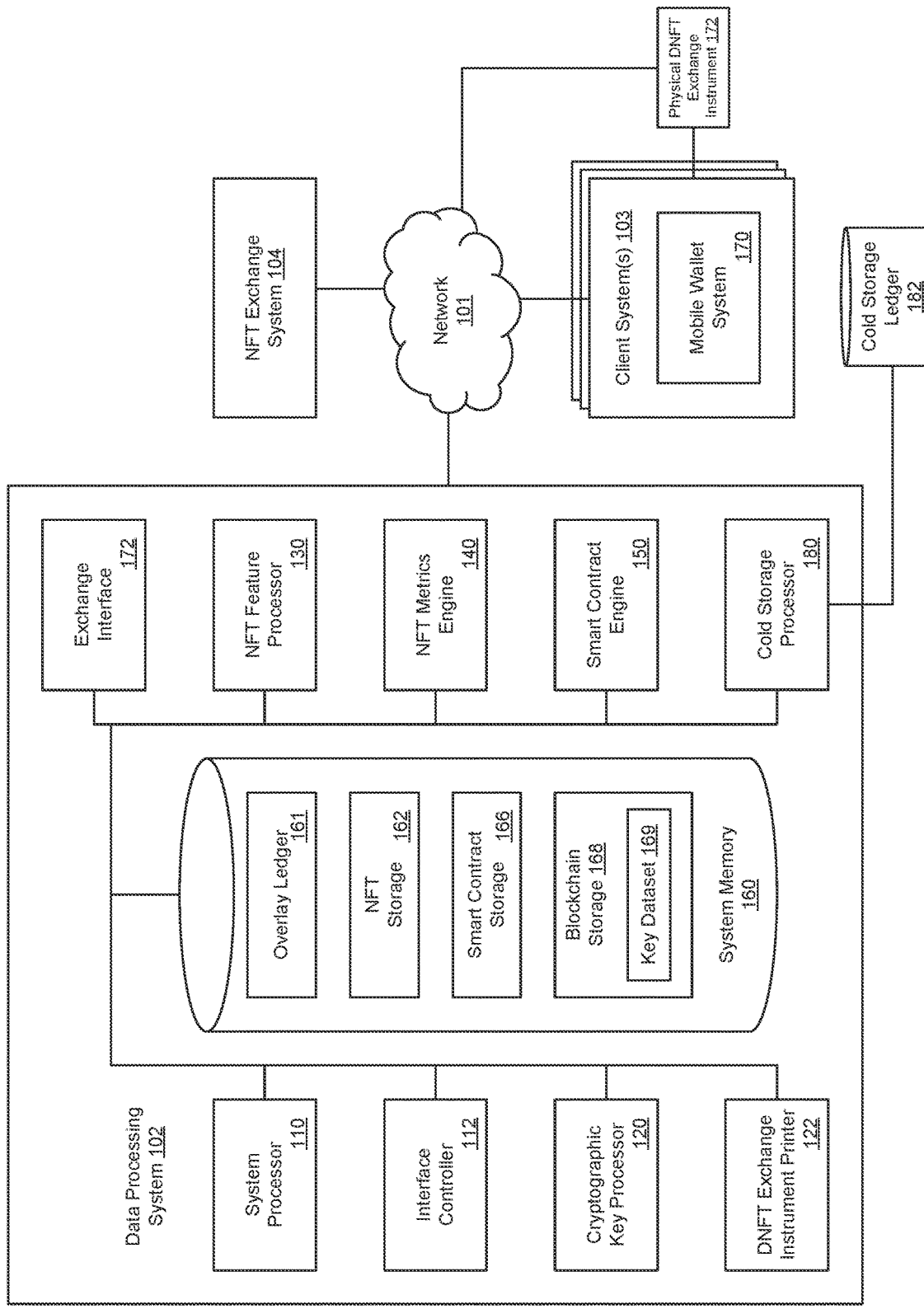
FIG. 1 depicts an example system, in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

This technical solution can include a smart contract control structure that encapsulates a protected NFT. The smart contract control structure can allow output of various contents linked to the protected NFT upon determining at least one outputting attribute of a plurality of outputting attributes is satisfied. For example, the smart contract control structure can be restricted to execution at a particular geographic location or computing environment by a protected NFT restricted to within the particular geographic location or computing environment. The smart contract control structure, and the protected NFT within the smart contract control structure, can be rendered unusable outside the particular computing environment. This technical solution can include multiple layers of secure access control to restricted NFTs, including authorization control at a smart contract layer by one or more tokens, and authorization control at a container layer by a private key. The private key can be based on one or more tokens, and can be fully contained within a single token or partially contained within multiple tokens. This technical solution can include generation of smart contract control structures and modification of blockchain architecture to restrict particular NFTs. A smart contract can, for example, generate or modify a smart contract to contain one or more particular NFTs. The generator smart contract can search a blockchain to identify NFTs satisfying particular attributes or parameters. The attributes can be transmitted to the generated smart contract by a token. The generated smart contract can generate a token that can include a NFT, a semi-fungible token, or a fungible token, and can distribute that token while retaining locally the smart contract control structure and its restricted NFTs.

The systems described herein provide improvements over typical asset exchange systems and data storage/access system. That is, the technical problem that arises from typical exchange systems and data systems occurs when assets and data of the assets are stored and transferred (e.g., physical or digitally) with minimal security or authorization checks. For example, when a physical asset (e.g., new product release) is sent from a country in Europe (e.g., origin) to a state in the United States (e.g., destination), the physical asset or digital may be tracked based on scanning a barcode at particular stops between the origin and destination (e.g., at a supplier, at customs, at another provider within the supply chain). However, in the following example, the asset itself and data stored in or on the physical or digital asset may be modified or changed (e.g., compromised) without knowledge of the asset tracking system or data storage/access system. For example, new product releases may be vulnerable to compromise (e.g., reverse engineering, source code stealing, product information, etc.) by hackers or competitors. Thus, to improve asset protection and data securitization, the technical solution is accomplished by obfuscating and protecting the assets (e.g., digital or virtual) utilizing a protected NFT that is restricted utilizing one or more particular control structures. This not only protects assets from hackers (or competitors) by reducing or eliminating the exposure or potential for manipulation of protected or private information of assets, but also protects entities and users from exposing their protected or private information (e.g., suppliers, origin, product information, source code, release dates), which is a significant improvement to the security and integrity of assets and data that are exchanged.

FIG. 1 depicts an example system, in accordance with present implementations. As illustrated by way of example in FIG. 1, an example system 100 can include at least a network 101, a data processing system 102, a client system 103, and an NFT exchange system 104.

The network 101 can include any type or form of network. The geographical scope of the network 101 can vary widely and the network 101 can include a body area network (BAN), a personal area network (PAN), a local-area network (LAN), e.g., Intranet, a metropolitan area network (MAN), a wide area network (WAN), or the Internet. The topology of the network 101 can be of any form and can include, e.g., any of the following: point-to-point, bus, star, ring, mesh, or tree. The network 101 can include an overlay network which is virtual and sits on top of one or more layers of other networks 101. The network 101 can include any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPV6), or the link layer. The network 101 can include a type of a broadcast network, a telecommunications network, a data communication network, or a computer network.

The data processing system 102 can include a physical computer system operatively coupled or that can be coupled with one or more components of the system 100, either directly or directly through an intermediate computing device or system. The data processing system 102 can include a virtual computing system, an operating system, and a communication bus to effect communication and processing. The data processing system 102 can include a system processor 110, an interface controller 112, a cryptographic key processor 120, an NFT feature processor 130, an NFT metrics engine 140, a smart contract engine 150, a system memory 160, an exchange interface 172, and a cold storage processor 180.

The system processor 110 can execute one or more instructions associated with the system 100. The system processor 110 can include an electronic processor, an integrated circuit, or the like including one or more of digital logic, analog logic, digital sensors, analog sensors, communication buses, volatile memory, nonvolatile memory, and the like. The system processor 110 can include, but is not limited to, at least one microcontroller unit (MCU), microprocessor unit (MPU), central processing unit (CPU), graphics processing unit (GPU), physics processing unit (PPU), embedded controller (EC), or the like. The system processor 110 can include a memory operable to store or storing one or more instructions for operating components of the system processor 110 and operating components operably coupled to the system processor 110. For example, the one or more instructions can include one or more of firmware, software, hardware, operating systems, embedded operating systems. The system processor 110 or the system 100 generally can include one or more communication bus controller to effect communication between the system processor 110 and the other elements of the system 100. For example, the processor can transfer, based on the scaled value of the first NFT, a second public and private key pair to the smart contract linked with a second scaled value of the first NFT and the first NFT.

The interface controller 112 can link the data processing system 102 with one or more of the network 101, the client system 103, and the NFT exchange system 104, by one or more communication interfaces. A communication interface can include, for example, an application programming interface ("API") compatible with a particular component of the data processing system 102, the client system 103, or the NFT exchange system 104. The communication interface can provide a particular communication protocol compatible with a particular component of the data processing system 102 and a particular component of the client system 103 or the NFT exchange system 104. The interface controller 112 can be compatible with particular metadata objects, and can be compatible with particular metadata delivery systems corresponding to particular metadata objects. For example, the interface controller 112 can be compatible with transmission of video content, audio content, or any combination thereof. For example, the interface controller 112 can be compatible with payment processing transmissions by a protocol compatible with payment processing latency and encryption structures.

The cryptographic key processor 120 can generate and modify cryptographic keys. For example, the cryptographic key processor 120 can include one or more asymmetric or symmetric key generators, and can generate public-private key pairs. For example, a public-private key pair can include a public key configured to encrypt in accordance with a particular transform process. For example, a public-private key pair can include a private key configured to decrypt in accordance with a particular transform process compatible with the public key. The cryptographic key processor 120 can link the public-private key pair with any individual object or component. The cryptographic key processor 120 can link any public key or private key corresponding to the public-private key pair with any individual object or component. For example, the cryptographic key processor 120 can generate a key compatible with or linked with a particular identifier corresponding to a particular, device, user, customer, account, system, or any combination thereof.

The NFT feature processor 130 can identify one or more characteristics (sometimes referred to as "attributes" or "rules") of one or more NFTs. For example, the feature processor 130 can identify one or more characteristics of an individual NFT or a plurality of NFTs satisfying one or more criteria. The NFT feature processor 130 can generate a particular feature corresponding to one or more characteristics of an NFT or an object linked with the NFT. For example, a feature can include a scalar or vector quantity corresponding to one or more vales of an aspect of an NFT. For example, a feature can include a list of coordinates corresponding to a line identified in an image linked with an NFT. For example, a feature can include a numeric value corresponding to an identifier of an NFT. For example, criteria by which NFTs can be identified can include aspects of the NFT, fields or components of the NFT, transform processes used to generate or modify the NFT, aspects of a metadata object linked with the NFT, or any combination thereof. For example, aspects of the NFT can include a hash of the NFT, or a value of an individual field of the NFT. For example, aspects of the NFT can include a hash of the NFT, or a value of an individual field of the NFT. For example, aspects of a metadata object linked with the NFT can include a bitmap of an image linked with the NFT, or a hash of a media metadata linked with the NFT. Media metadata can include images, audio, three-dimensional (3D) models, or any combination thereof.

The NFT metrics engine 140 can generate and modify one or more metrics based on one or more NFTs. For example, the NFT metrics engine 140 can generate a metric based one or more features obtained from the NFT feature processor 130. For example, the NFT metrics engine 140 can generate a metric to indicate a particular value or type of a particular NFT. The NFT metrics engine 140 can generate metrics compatible with particular thresholds. For example, the thresholds can activate particular transforms of an aspect of an NFT, feature or metric. For example, the thresholds can execute one or more instructions corresponding to a particular NFT or type of NFT, type of object linked an NFT, or any combination thereof. For example, the NFT metrics engine 140 can determine that a particular metric having a particular value and based on a type of an NFT satisfies a threshold that indicates a particular value compatible with the particular value of the metric.

The smart contract engine 150 (sometimes referred to as the "smart contract processing circuit") can generate and modify one or more smart contracts. The smart contract engine 150 can execute instructions to generate or modify a cryptographic container, to add or remove objects from a cryptographic container, and to execute various processors linked with or embedded with a smart contract. For example, the smart contract engine 150 can execute various processors of a smart contract in response to an indication from the NFT metrics engine 140 that a metric satisfies a particular threshold. For example, the smart contract engine 150 can execute various processors of a smart contract in response to detecting input including or corresponding to a particular token at the smart contract. For example, the smart contract engine 150 can include processors to read, write, generate, or modify one or more objects contained within a container of the smart contract, one or more tokens input to the smart contract, or one or more processors of the smart contract.

Additionally, the smart contract engine 150 can validate one or more tokens against one or more smart contracts. The smart contract engine 150 can obtain one or more tokens, and can compare one or more token to one or more tokens requested by a particular smart contract. The smart contract engine 150 can detect whether a particular token is compatible with a particular smart contract by detecting whether a particular token matches a particular token characteristic associated with a particular smart contract. For example, the smart contract engine 150 can detect that a token is compatible with a smart contract based on comparing a hash of the token with a hash included in the smart contract. The smart contract engine 150 can generate an authorization indication based on one or more determinations, and can transmit the authorization indication to the system processor 110. The smart contract engine 150 can, for example, provide a control structure or one or more metadata objects to the system processor 110, in response to the authorization indication, by decrypting the encapsulation layer of the control structure. The smart contract engine 150 can, for example, execute the smart contract with the compatible tokens to retrieve a particular control structure for the smart contract, or a reference to the particular control structure, from the smart contract storage 166.

The exchange interface 172 can communicate with one or more external systems compatible with transferring an NFT. For example, the exchange interface 172 can include an application programming interface (API) compatible with the NFT exchange system 104 and the client system 103. For example, the exchange interface 172 can be configured to receive characteristics associated with particular NFTs, types of NFTs, or metadata objects linked with particular NFTs. For example, the exchange interface 172 can be configured to receive particular quantitative values corresponding to particular transfer of NFTs between accounts. The exchange interface 172 can thus provide the technical improvement of protecting NFTs generated or received in response to transfer of an NFT between storage locations or blockchain locations. The exchange interface 172 can provide the technical improvement of providing a communication interface compatible with particular NFT transfer operations.

The system memory 160 can store data associated with the system 100. The system memory 160 can include one or more hardware memory devices to store binary data, digital data, or the like. The system memory 160 can include one or more electrical components, electronic components, programmable electronic components, reprogrammable electronic components, integrated circuits, semiconductor devices, flip flops, arithmetic units, or the like. The system memory 160 can include at least one of a non-volatile memory device, a solid-state memory device, a flash memory device, and a NAND memory device. The system memory 160 can include one or more addressable memory regions disposed on one or more physical memory arrays. A physical memory array can include a NAND gate array disposed on, for example, at least one of a particular semiconductor device, integrated circuit device, and printed circuit board device. The system memory 160 can include an overlay ledger 161, an NFT storage 162, a smart contract storage 166, and a blockchain storage 168 including a key dataset 169.

The smart contract storage 166 can store one or more smart contracts and corresponding addresses for particular smart contracts that indicate links with the corresponding smart contracts. The co smart contract storage 166 can also store one or more control structures and their contained metadata objects and corresponding addresses for particular control structures that indicate links with the corresponding control structures. The blockchain storage 168 can store one or more blockchains linked to one or more smart contracts, tokens, control structures, or metadata objects, by corresponding addresses for particular smart contracts, tokens, control structures, or metadata objects that indicate links with a particular blockchain.

The NFT storage 162 can store one or more NFTs and corresponding addresses for particular NFTs that indicate links with the corresponding NFT. The NFT storage 162 can include NFTs associated with the data processing system 102 or any component thereof, the client system 103 or any component thereof, any metadata object, or any combination thereof. The key dataset 169 can store cryptographic keys associated with the data processing system 102 or any component thereof, the client system 103 or any component thereof, any metadata object, or any combination thereof. For example, the key dataset 169 can include public-private key pairs or private keys corresponding to particular accounts, NFTs, smart contracts, devices, users, systems, or any combination thereof. The smart contract storage 166 can store one or more smart contracts and corresponding addresses for particular smart contracts that indicate links with the corresponding smart contracts. The blockchain storage 168 can store one or more blockchains linked to one or more smart contracts, tokens, containers, or metadata objects, by corresponding addresses for particular smart contracts, tokens, containers, or metadata objects that indicate links with a particular blockchain. In some embodiments, the NFT storage 162 can also store one or more fungible tokens and semi-fungible tokens. The NFT storage 162 can store corresponding addresses for particular fungible tokens that indicate links with the corresponding fungible tokens, and can store corresponding addresses for particular semi-fungible tokens that indicate links with the corresponding semi-fungible tokens.

The client system 103 can include a computing system located remotely from the data processing system 102. The client system 103 can include a mobile wallet system 170. The mobile wallet system 170 can include an interface to execute instructions corresponding to a particular wallet account, and to modify the structure or contents of a particular smart contract corresponding to a wallet account. For example, the mobile wallet system 170 can include a user interface to receive input that indicates selections of various NFTs, transactions, accounts, devices, users, or systems. For example, the user interface can include a graphical user interface that can be presented at a display device. The display device can display at least one or more user interface presentations, and can include an electronic display. An electronic display can include, for example, a liquid crystal display (LCD), a light-emitting diode (LED) display, an organic light-emitting diode (OLED) display, or the like. The display device can receive, for example, capacitive or resistive touch input. The mobile wallet system 170 can transmit one or more instructions, tokens, keys, or any combination thereof to, from, or with the data processing system 102.

The client system 103 may be used by a third party with a relationship to the NFT exchange system 104 or data processing system 102 (e.g., vendor, customer, entity, supplier, and so on) to perform various actions and/or access various types of data, some of which may be provided over network 101. The term "client" as used herein may refer to an individual operating one or more client systems 103 and interacting with resources or data via the client system 103.

The client system 103 may be used to electronically transmit data (e.g., exchange requests, attributes, NFTs) to the data processing system 102, to access websites (e.g., using a browser), the internet (e.g., using a mobile application, such as a decentralized application (dApp)), supply services, supply products, and to receive and/or transmit any other types of data (e.g., geographic location data of digital or physical assets, environment data of digital or physical assets). In some arrangements, client system 103 can be configured to collect and provide environmental data to the data processing system 102. For example, a client may be a supplier of a software application installed on a physical asset. In another example, a client may be a supply chain or logistics company that transfers physical and digital assets. In yet another example, a client may be an individual person. The client system 103 (sometimes referred to herein as a "computing system") may be a mobile computing device, desktop computer, smartphone, tablet, smart watch, smart sensor, or any other device configured to facilitate receiving, displaying, and interacting with content (e.g., web pages, mobile applications, such as decentralized application (dApp), etc.). Client system 103 may also include an input/output circuit for communicating data over network 101 to data processing system 102 and NFT exchange system 104. In some arrangements, each client system 103 can have a digital wallet address or exchanging (e.g., receiving or sending) fungible or non-fungible values (e.g., cryptocurrency, digital currency, stocks, bonds, loan, deed, etc.).

The NFT exchange system 104 can transfer an NFT between one or more smart contracts, blockchains, systems, or any combination thereof, or the like. The NFT exchange system 104 can include an exchange network to identify particular NFTs and transfer particular NFTs between particular wallet accounts or systems, for example. The NFT exchange system 104 can receive an instruction to transfer an NFT from a first account to a second account, and can be linked with a quantitative value indicating a value of the NFT. For example, the quantitative value can correspond to a value of fiat currency, math-based currency (MBC), or any combination thereof. For example, MBC can include cryptocurrency or the like. The NFT exchange system 104 can detect characteristics associated with particular NFTs, types of NFTs, or metadata objects linked with particular NFTs, and can detect particular quantitative values corresponding to particular transfer of NFTs between accounts.

Still referring to FIG. 1, in some arrangements, upon receiving an NFT the cryptographic key processor 120 can identify public keys and private keys associated with the NFT. For example, the cryptographic key processor 120 upon identifying private keys of the NFT, can verify the NFT using one or more identified private keys. In the following example, the NFT may have been previously stored on data processing system 102 and the public-private key pairs may be stored throughout the data processing system 102 (e.g., in blockchain storage 168, in cold storage ledger 182). In some arrangements, the received NFT may be an external NFT stored on storage medium or cache remote from the data processing system 102 (e.g., digital wallet, crypto-wallet, any other storage medium or cache), such as on client system 103 or NFT exchange system 104. In particular, an external NFT received by the data processing system 102 can initiate a key generation process described with reference to block 832 of method 800 and block 930 of method 900.

In some arrangements, the cryptographic key processor 120 can sign the NFT using a private key and verify the NFT using a public key. Thus, in some arrangements, verifying can include decrypting the NFT using the public key to verify the digital signature came from the particular private key (e.g., particular digital wallet of a user), and signing can include encrypting the NFT using the private key to create a digital signature. In various arrangements, cryptographic key processor 120 can sign the NFT using a public key and verify the NFT using a private key. Thus, in various arrangements, verifying can include decrypting the NFT using the private key to verify the digital signature came from the particular public key or public address (e.g., particular digital wallet of a user), and signing can include encrypting the NFT using the public key to create a digital signature. It should be understood that a public key and public address are used herein interchangeably, but in some arrangements, the public address may be a hashed version of the public key based on a hash function.

In some arrangements, the keys may be symmetric (e.g., use the same key to sign/verify) or asymmetric (e.g., use different keys to sign/verify). For example, each key of the public-private key pair may identical. In another example, an algorithm (e.g., such as a hash algorithm) can be applied to a private key to generate a public key. Accordingly, public keys can be a cryptographic code that allows users and system described herein to receive digital assets and verify them prior to amending and/or updating a ledger (e.g., 168, 182).

In some arrangements, generation of public-private keys can include concatenating multiple public-private key pairs into a single public-private key pair based on merging, using a math-based function, multiple key pairs. For example, a wallet public key or wallet public-private key pair can be provided by the mobile wallet system 170 with an NFT (e.g., for deposit). The cryptographic key processor 120 (and/or container key processor 322 of FIG. 3) can generate a new internal public-private key pair prior to store the NFT (e.g., restricted NFT 220). However, prior to storing the NFT the cryptographic key processor 120 can improve the security of the restricted NFT 220 by merging the wallet public key and the internal public key to create a new internal public key including both the wallet public key and the internal public key. The math-based function can be, but is not limited to, a Rivest-Shamir-Adleman, elliptic curve cryptography, Digital Signature Algorithm, asymmetric algorithm, hash algorithm or function, or symmetric algorithm, and so on. For example, executing the math-based function can include generating (or aggregating) a concatenated public key based on executing a concatenation of the wallet public key and the additional public key and hashing, utilizing salting, the concatenated public key based on a hash function, wherein salting includes providing random data and the concatenated public key as input to the hash function. In particular, the "salt" can be random data such as random bits that is used as an additional input to a one-way function such as a hashes or encryption algorithm. A new salt can be randomly generated by the cryptographic key processor 120 (and/or container key processor 322 of FIG. 3) each time salting occurs. Salting can occur randomly to further protect public-private key pairs and salting can occur based on a preference of a user depositing an NFT or token or in response to analyzing metadata of the NFT or received token (e.g., based on value of the NFT or data stored in the metadata object 224 such as protected data). It should be understood that salting can be used to generate any public or private key described herein.

Still referring to FIG. 1, in some arrangements, the interface controller 112 can establish a data channel between a source address and a destination address, such that receivals or transmissions of an NFT occurs between the addresses on a ledger (e.g., blockchain storage 168) and/or a digital wallet (e.g., client system 103). An address can be generated based on executing, by the cryptographic key processor 120, a math-based function (e.g., hash, symmetric encryption, asymmetric encryption) on a public key of a public and private key pair (or a verification key of a verification and signing key pair). For example, if an interface controller 112 receives an NFT from any system or device described herein, the NFT or other data received may include metadata associated with a source address, and the interface controller 112 may determine a destination address (e.g., may be provided to the system sending the NFT in advance) to store the NFT in the blockchain storage 168. In various arrangements, the addresses may be a unique sequence of randomized (or pseudo-randomized) numerical digits, characters, punctuation, whitespace, code (e.g., QR), or symbols.

In some arrangements, the cryptographic key processor 120 can also be configured to generate public and private key pairs and the interface controller 112 can be configured to provide public keys (e.g., or public and private key pairs, or private keys) to one or more computing devices (e.g., client system 103, NFT exchange system 104) for use in an NFT exchange. That is, the interface controller 112 can interface (e.g., using an API) with one or more other ledger systems (other blockchain ledgers) and wallets (e.g., digital, crypto, and so on). In various arrangements, the public and private key pair can be generated based on a cryptographic function (e.g., symmetric-key algorithms (such as DES, AES), asymmetric-key algorithms (Ed25519 signing, ECC), public-key algorithms (such as RSA), and so on) and be stored in the data processing system 102. In various arrangements, the keys of the public and private key pairs may be stored in separate locations. For example, public keys may be stored in key dataset 169 and the private keys may be stored in cold storage ledger 180. In some arrangements, the public and private key pairs may be stored together (as one data package) in key dataset 169. In some arrangements, the data processing system 102 can maintain (e.g., store and access keys) the key dataset 169 such that each NFT may be locked-unlocked and associated with a public key or public-private key pair stored on the key dataset 169. In various arrangements, public-private key pairs can be shared amongst a plurality of NFT or can be unique to each NFT on the blockchain storage 168.

In various arrangements, the sender (e.g., a source party such as a user, provider, or entity) can utilize its private key (or public key) to generate a digital signature. The process of signing the message uses a mathematical operation that can be performed by the device (e.g., 103, 104) of the sender who possesses the private key. The NFT and the digital signature can then be sent to a recipient. As will be appreciated, the recipient (e.g., destination party) can be a user, provider, and/or entity (e.g., 102) that can use the digital signature and the sender's public key (or private key) to verify that the sender is the signer of the NFT and that the integrity and origin authenticity of the NFT has not been compromised. In some arrangements, the NFTs on the blockchain storage 168 may be associated with an account (e.g., designated in a field such as an account_ID field in the metadata of the NFT) (sometimes referred to herein as an "NFT account").

In some arrangements, the overlay ledger 161 provides a record of association for NFTs with an NFT account. The overlay ledger 161 associates a customer's account with one or more NFTs transferred, stored, and/or monitored by the data processing system 102. The overlay ledger 161 may be stored in system memory 160. Each NFT account for customers may be a single entry in the database. The blockchain storage 168 may be used to track exchanges (e.g., deposits, withdrawals, and updates of NFTs) for each of the specific NFT accounts. The data processing system 102 updates the overlay ledger 161 after each NFT exchange into and out of the blockchain storage 168. In certain situations, the data processing system 102 may update the overlay ledger 161 without an exchange of an NFT into or out of the blockchain storage 168. For example, if a first customer wants to transfer a designated NFT (or portion of an NFT) to a second customer, and both customers are NFT account holders with the data processing system 102, the transfer may be effectuated by updating the overlay ledger 161 without an actual exchange of an NFT in the blockchain storage 168. The transferring and exchanging of fungible and non-fungible values performed or executed by the one or more processors, according to various illustrative arrangements, is described in U.S. patent application Ser. No. 17/528,352, filed Nov. 17, 2021, the entirety of which is incorporated by reference herein.

Still referring to FIG. 1, the overlay ledger 161 can store the associations of NFTs with NFT accounts (e.g., the association between an NFT account and the NFTs owned or partially owned by the NFT account), while the blockchain storage 168 can store portions of NFTs (e.g., smart contracts containing information pointing to the off-chain content and metadata, such as data stored in NFT storage 162) and keys of the NFT (e.g., stored in key dataset 169). For example, the content and metadata of the NFT may be stored in an on-chain hash that can point to a storage location of the content and metadata.

The cold storage processor 180 can execute one or more actions with respect to generating (or creating), updating, protecting, and destroying cold storage objects in the cold storage ledger 182. In some arrangements, the cold storage processor 180 can communicate with the cold storage ledger 182 via an intermittent secure connection. In some arrangements, the process of establishing an intermittent secure connection can include disconnecting the data processing system 102 from all networks (e.g., internet connections, wired connections) and connecting via a wired network connection or a wired or wireless local network connection (e.g., local area network (LAN), intra-network). The connection can be intermittent or discontinuous since the data processing system 102 can perform many functions without having to access the cold storage ledger 182. However, in some arrangements, when an exchange of an NFT stored on the data processing system 102 is initiated, an intermittent secure connection may be established. In various arrangements, the customer with an NFT account or the data processing system 102 can add an attribute to each metadata object indicating whether a cold storage exchange must occur when exchanging the particular NFT. As used herein, "cold storage exchange" refers to the process of performing an exchange of an NFT using a cold storage object stored on the cold storage ledger 182.

In various arrangements, any data shared over the intermittent secure connection can be encrypted and/or secured (e.g., hashed, password protected) to prevent unauthorized parties from performing unauthorized actions on the intermittent secure connection. For example, a masking algorithm may be executed performing bitwise operations (e.g., NOT, AND, NAND, OR, XOR, Complement, left-shift (logical or arithmetic), right-shift (logical or arithmetic), rotate right, rotate left, and so on) on any data transferred over the intermittent secure connection. Additionally, all communications over the intermittent secure connection can be encrypted with one or more secure network protocols (e.g., Secure Shell (SSL), Kerberos, IPSec, Secure Sockets Layer (SSL), Hypertext Transfer Protocol Secure (HTTPS), and so on) implemented utilizing a cryptographic function (e.g., symmetric encryption, asymmetric encryption, hashing, and so on). For example, the cryptographic function could be a homomorphic encryption function. In other examples, the cryptographic function could be any symmetric encryption function (e.g., Triple Data Encryption Standard (TDES), RC5, Advanced Encryption Standard (AES), Blowfish, CAST, and so on), and/or asymmetric encryption function (e.g., Rivest-Shamir-Adleman (RSA), Efficient and Compact Subgroup Trace Representation (ECSTR or XTR), Digital Secure, Escrowed Encryption Standard (EES), and so on).

In general, a cold storage object can be a data structure that can be structured and formatted for storing data about NFTs. For example, each NFT can include a linked metadata object and the metadata object may include protected and unprotected data. As used herein, "protected data" can include sensitive data such as, but not limited to, social security numbers (SSN), passport number, deoxyribonucleic acid (DNA), financial account number, other personal identifying information, biometric information, geolocation data indicating one or more locations of a person, photographs of people, criminal records, credit and/or payment card numbers, health data, and so on, whereas "unprotected data" can include data not considered sensitive data. In various arrangements, the data processing system 102 can analyze, based on accessing the link of the NFT, the metadata object to determine if any protected data is present. That is, when protected data is present, the cold storage processor 180 may update the metadata object by extracting the protected data and storing the protected data in a newly generated cold storage object. For example, the data processing system 102 can determine, via the link of the NFT, a first portion of metadata of the metadata object of the NFT associated with protected data of the first NFT and a second portion of metadata of the metadata object of the NFT associated with unprotected data of the first NFT, where the first portion of metadata does not contain any data from the second portion of metadata. In the following example, the cold storage processor 180 can remove or extract remove the first portion of metadata of the metadata object of the NFT based on accessing the metadata object via the link, and in turn generate a cold storage object with the protected data and the cold storage private key.

In some arrangements, the NFT transaction processor 250 of the data processing system 102 can generate an unprotected public-private key pair of the first NFT comprising the updating link with the second portion of metadata of the metadata object. In particular, the metadata object can be deconstructed to include the unprotected data prior to storing the NFT and can be reconstructed to include the protected data prior to performing an exchange. For example, a smart contract control structure can include code for executing an NFT reconstruction process to reconstruct the metadata object at the link of the NFT. Reconstruction can include updating the metadata object linked to the NFT to include protected data stored in a cold storage object and deconstruction can include updating the metadata object linked to the NFT to remove the protected data and store the protected data in the cold storage object.

In some arrangements, the process of generating a cold storage object can include storing a private key (e.g., internal private key, wallet private key, or both) in the cold storage object. In determine which private key or both to store in the cold storage object, the cold storage processor 180 can based on if the NFT is a multi-sig NFT or a single-sig NFT. As used herein, "multi-sig" refers to a signature scheme that enforces multiple signatures for an exchange before it may be successfully approved, whereas "single-sig" refers to a signature scheme that requires a single signature for an exchange before it may be successfully approved. For example, in a multi-sig NFT scenario, both the private keys may be stored in the cold storage object. In another example, in a single-sig NFT scenario, only one of the private keys may be stored in the cold storage object. In the following example, the internal private key may be stored in the cold storage object by default unless the customer requests their wallet private key be used.

In some arrangements, the process of storing the cold storage object can include disconnecting, by the cold storage processor 180, all internet connections on the data processing system 102, establishing an intermittent secure connection, generating a cold storage public-private key pair (including similar features and function of the public-private key pairs described above), and storing, via the intermittent secure connection, the cold storage object at the cold storage public address (e.g., hash of the cold storage public key). In the following process, the cold storage processor 180 can reconnect all the internet connections on the system after disconnecting from the intermittent secure connection. In some arrangements, the cold storage public-private key may not be generated and instead the internal public-private key pair or the internal private key may be stored in the cold storage object. Additionally, in some arrangements, any update or exchange of an NFT initiated by the blockchain storage 168 can be temporarily transferred to the cold storage ledger 182 to sign it before the exchange occurs on the blockchain storage 168. For example, each cold storage object on the cold storage ledger 182 can include a cold storage public-private key pair. Accordingly, in response to receiving an exchange from a public address of an NFT on the blockchain storage 168, the NFT transaction processor 250 can transfer, via an intermittent secure connection, the NFT to the cold storage processor 180 for reconstruction (if previously deconstructed) and signing, using the cold storage private key of the cold storage object. In particular, once reconstructed and/or signed, the NFT can be transferred to the destination address (e.g., wallet public address). In some embodiments, the blockchain storage 168 may also sign the NFT (after or before the cold storage private key) to "two-key sign" the NFT for additional security and protection, such that the destination address must verify (and sometimes in the correct order of signing using the private key) the NFT with both the cold storage public key and the internal public key. Thus, two-key signing using multiple private keys can improve the security of NFTs.

Referring generally to the interplay and communication between the overlay ledger 161, the blockchain storage 168, and the cold storage ledger 182. The NFT transaction processor 250 can facilitate the communication between each of the overlay ledger 161, the blockchain storage 168, and the cold storage ledger 182. Additionally, the NFT transaction processor 250 can generate cold storage objects, establish intermittent secure connections with the cold storage ledger 182, generate and store NFT accounts in the overlay ledger 161, communicate with the overlay ledger 161 the recordation of NFTs to NFT accounts, store keys in the key dataset 169 of the blockchain storage 168, and generate smart contract control structures 210 and link various features of NFTs include metadata objects 224 with the blockchain 260 of the blockchain storage 168. The overlay ledger 161 provides a record of association for the NFT with an NFT account, the blockchain storage 168 provides storage for one or more blockchains linked to one or more smart contracts, tokens, containers, or content objects, by corresponding addresses for particular smart contracts, tokens, containers, or content objects that indicate links with a particular blockchain, and the cold storage ledger 182 provides storage for one or more cold storage objects including a private key of an NFT and a portion of metadata of the metadata object of the NFT. In some arrangements, when an exchange occurs, each of the overlay ledger 161, the blockchain storage 168, and the cold storage ledger 182 can execute various functions and code to deposit, withdraw, or update an NFT stored on the data processing system 102.

For example, a deposit of an NFT can include (1) updating the overlay ledger 161 recording the NFT with a particular NFT account, (2) broadcasting the NFT to an internal public address on the blockchain storage 168, and (3) generating and storing a cold storage object in the cold storage ledger 182. In another example, an update of an NFT can include (1) broadcasting the updated NFT to an internal public address on the blockchain storage 168 and/or (2) generating and storing a new cold storage object (e.g., sometimes may be skipped) in the cold storage ledger 182, and since NFT is still associated with the account, the overlay ledger 161 may not be updated. In yet another example, a withdrawal or transfer of an NFT within the data processing system 102 (e.g., between accounts stored on the overlay ledger 161) can include (1) updating the overlay ledger 161 recording the NFT with a different NFT account and/or (2) generating and storing a new cold storage object (e.g., sometimes may be skipped) in the cold storage ledger 182, and since NFT is still associated with an account on the overlay ledger 161, the blockchain storage 168 may not be updated. In yet another example, a withdrawal or transfer of an NFT outside the data processing system 102 (e.g., between at least one account not stored on the overlay ledger 161) can include (1) updating the overlay ledger 161 removing the association of the NFT with a particular NFT account, (2) transferring the NFT to an un-spendable address on the blockchain storage 168, and (3) removing or destroying the cold storage object in the cold storage ledger 182.

Still referring to FIG. 1, in some arrangements, the data processing system 102 may receive a deposit of NFTs from the client system 103, and the client system 103 may have an account with the data processing system 102. In the following example, the data processing system 102 may encapsulate and deposit the NFT (e.g., after verifying the digital signature) on the data processing system 102. Additionally in some arrangements, a deposit can include extrapolating (by the NFT feature processor 130) various information from the NFT and storing the information in various storages (e.g., blockchain storage 168, overlay ledger 161, cold storage ledger 182). In one example, a deposit of an NFT can include updating (e.g., by an overlay ledger 161) an NFT account of a plurality of NFT accounts in an overlay ledger 161 by recording ownership of the NFT with the NFT account. In the following example, a deposit can further include generating and storing (e.g., by a cold storage processor 180) a first cold storage object in a cold storage ledger 182, where the first cold storage object can include the wallet private key (or internal key) of the NFT and at least a first portion of metadata of the metadata object of the NFT. In the following example, a deposit can further include broadcasting (e.g., by a blockchain storage 168) the NFT to the blockchain storage 168 at the internal address (e.g., hash of an internal public key).

As used herein, "wallet keys" (including wallet public-private key pairs, wallet public key, and wallet private key) can be cryptographic keys of a token (e.g., NFT) used by the client system 103 to sign the token, verify the token, and protect the token. As used herein, "internal keys" (including internal public-private key pairs, internal public key, and internal private key) can be cryptographic keys of a token (e.g., NFT) used by the data processing system 102 to sign the token, verify the token, and protect the token.

In some arrangements, verifying and/or authenticating the NFT can further include communicating (e.g., by the interface controller 112) with other systems (e.g., ledgers or digital wallets) to notify the other systems that the NFT was verified and/or authenticated (e.g., transferred and stored on data processing system 102). For example, the client system 103 may provide a signed NFT to the data processing system 102. In the following example, data processing system 102 can receive the NFT and perform verification and/or authentication. Upon verifying and/or authenticating, data processing system 102 may notify (e.g., send a message) the client system 103 or NFT exchange system 104 (e.g., whoever transmitted the NFT) that an NFT (or a plurality of NFTs) were verified and/or authenticated. Further in this example, the client system 103 or NFT exchange system 104 may in turn destroy or update the digital wallet (or ledger) based on the successful verification. In some arrangements, when the NFT (or NFTs) are transferred between computing systems or device, the sender's ledger or wallet may be voided since the public-private key pair would be invalid (e.g., cannot be used to sign or verify an exchange). That is, while the ledger or wallet may not destroy or update the NFT when they are transferred to the data processing system 102, the NFT on the sender's ledger or wallet would be unusable or unvalued.

In some arrangements, the interface controller 112 may receive a withdrawal or exchange request of one or more NFTs stored on the data processing system 102, where a user (e.g., operating the client system 103) may have an account with the data processing system 102. Further in this example, the data processing system 102 may in turn destroy the NFT and/or update the storages (e.g., 161, 168, 182) based on the successful withdrawal or exchange. In some arrangements, when an NFT is exchanged between data processing system 102 and another ledger or wallet (e.g., digital wallet of client system 103 or NFT exchange system 104), the NFT may be voided or burned since the public-private key pair would be invalid (e.g., cannot be used to sign or verify an exchange). Voiding or burning can include transmitting the NFT to an un-spendable address (e.g., where no one knows the private key). That is, while the blockchain storage 168 may not destroy or update the NFT when they are exchanged to a different ledger or off-chain, the NFT on the sender's ledger would be unusable or unvalued.

Referring to the blockchain storage 168 (sometimes referred to herein as a "blockchain ledger 168") described herein generally. The blockchain storage 168 (or ledger) can include a key dataset 169 and a blockchain. The blockchain storage 168 can be configured to store and/or maintain any of the information described herein (e.g., NFTs or portions of NFTs, smart contracts, public and private key pairs, etc.). In some arrangements, the described ledger systems and methods involve utilizing one or more processors. The one or more processors allow receiving, collecting, and sending of environmental data, exchange requests (e.g., withdrawal, deposit), public and private key pairs, attributes, smart contracts, and so on. The one or more processors can then communicate with one or more nodes of the blockchain storage 168 and execute one or more smart contracts stored on the nodes to perform various checks (e.g., signing, verifying, distributing, exchanging).

Still referring to FIG. 1, in various arrangements, the key dataset 169 can include a plurality of public and private key pairs (referred to hereafter as "key pairs"). In some arrangements, the key dataset 169 may include a public key and a pointer (e.g., cold storage public key, hash address, or cold storage address) to a cold storage object (e.g., 184) stored in cold storage ledger 182. In some arrangements, the key dataset 169 can include a hardware security module (HSM) that can manages cryptographic keys. Each key pair can be stored in the key dataset utilizing a cryptographic function. For example, the cryptographic function could be a homomorphic encryption function. In another example, the cryptographic function could be any symmetric encryption function (e.g., Triple Data Encryption Standard (TDES), RC5, Advanced Encryption Standard (AES), Blowfish, CAST, and so on), and/or asymmetric encryption function (e.g., Rivest-Shamir-Adleman (RSA), Efficient and Compact Subgroup Trace Representation (ECSTR or XTR), Digital Secure, Escrowed Encryption Standard (EES), and so on). In some arrangements, the private key can be used to encrypt NFTs (e.g., using a cryptographic function to sign) at the source system when an exchange occurs (e.g., send NFT from a source address to a destination address). In various arrangements, the public key can be used by the destination system to decrypt (e.g., verify) the encrypted NFT. For example, the sender (source) of an NFT stored in a digital wallet can sign (e.g., "lock") the NFT or data package including the NFT to be exchanged with a private key stored in a digital wallet or on the user device (e.g., 103) of the user and in turn, transmit the NFT and share the public key for verifying (e.g., "un-locking") by the receiver, such as the data processing system 102. Additionally in some arrangements, the public key can be used to encrypt NFTs and the private key can be used to decrypt the encrypted NFT. For example, the sender (source) of an NFT stored in a digital wallet can sign the exchange with a public key of and shared by the receiver (destination), and the receiver can in turn, verify the received NFT and/or data package including the NFT using the private key of the receiver.

In some arrangements, the blockchain storage 168 can include a plurality of nodes configured to store a copy of a plurality of NFTs. In various arrangements, each node may contain a copy of an individual NFT associated with an NFT account of the data processing system 102. In various arrangements, the plurality of nodes on the blockchain storage 168 can be interconnected via a central node (e.g., centralized or generalized). Indeed, each node can perform various operations (e.g., execute smart contracts, update NFTs) on-chain (e.g., on blockchain storage 168) or off-chain. Thus, the central node can operate as an intermediary between any system or device with data not stored on the blockchain storage 168 such that, any communications (e.g., exchange requests, withdrawals or deposits, updates, public and private key access) first is received by the central node. As such, the central node may be configured to route communications and/or query one or more nodes on the blockchain storage 168 upon receiving a communication from any system or device described herein. In some arrangements, the central node may be an NFT and may be the root node (e.g., the originally created NFT), and any additional nodes added may be attached (e.g., appended, pre-pended, linked, associated, embedded) to the central node via one or more communications networks (e.g., public, private, shared, and so on). In various arrangements, the central node may be a dummy asset that stores data (e.g., addresses) to communicate with the other nodes on the blockchain storage 168.

Alternatively, the plurality of nodes on the blockchain storage 168 could be interconnected with the plurality of nodes to form a peer-to-peer network (e.g., distributed ledger network). In the following arrangement, instead of a central node operating as an intermediary, each node may contain a copy of a plurality of NFTs stored and maintained by the data processing system 102 and can operate as an individual intermediary which may contain a copy of a NFTs stored and maintained by the data processing system 102. Additionally, each node could be configured to determine functions to perform (e.g., execute a smart contract, send public key, update NFT) based on communications. While various circuits, interfaces, and logic with particular functionality are shown, it should be understood that the blockchain storage 168 can include any number of circuits, interfaces, and logic for facilitating the functions described herein. For example, the activities of multiple circuits (or processors) may be combined as a single circuit and implemented on a single processing circuit, as additional circuits with additional functionality are included.

The data processing system 102 (in particular, NFT transaction processor 250) can be configured to process exchanges of NFTs (e.g., withdrawal, deposit, update) and may be configured to perform various actions and/or access various types of data or metadata, some of which may be provide over network 101. In particular, the NFT transaction processor 250 can be configured to process NFT exchanges based on received public keys (or public and private key pairs, or private key), environmental data, off-chain data, and metadata of one or more NFTs stored by and on data processing system 102 (e.g., in 161, 168, 182) from the systems and devices described herein. In some arrangements, exchanges of NFTs on-chain or off-chain include utilizing a control structure specific to the NFT or group of NFTs. Although the FIGS. and specification generally discuss utilizing control structures on NFT exchanges (e.g., withdrawals, deposits, updates), the systems, methods, and apparatuses disclosed herein can also be used for a plurality of tokens such as, but not limited to, utility tokens, security tokens, payment tokens, exchange tokens, decentralized finance (DeFi) tokens, stablecoins, asset-backed tokens, privacy tokens, and so on. Additional details and examples relating to exchanging NFTs are described in detail with reference to FIGS. 2-4.

In various arrangements, the DNFT exchange instrument printer 122 can be hard wired or wireless to the system processor 110. The DNFT exchange instrument printer 122 can be configured to generate, update, and store DNFT exchange instruments. For example, DNFT exchange instruments can be stored in a container 320 of a smart contract control structure 210 and be associated with one or more NFTs. The DNFT exchange instrument printer 122 can include a printer that can print a physical DNFT exchange instrument 172. For example, the DNFT exchange instrument printer 122 can be a financial card printer including an e-paper, e-ink, or display manufacturing device. For example, the DNFT exchange instrument printer 122 can be a financial card printer including an e-paper, e-ink, or display manufacturing device. In another example, DNFT exchange instrument printer 122 can be an industrial card printer, encoder, or laser engraver that can manufacture the card and an LCD or similar display can be manufactured by a display manufacturing machine (e.g., CRT, LCD, LED, plasma, OLED, and so on). Accordingly, the DNFT exchange instrument printer 122 can be configured to print a payment card that can include a display for presentation (e.g., physical DNFT exchange instrument 172). In some arrangements, the physical DNFT exchange instrument 172 may not include a display.

In various arrangements, the physical DNFT exchange instrument 172 can include a network interface and a display element. The network interface (sometimes referred to herein as a "network circuit") can allow the computing systems and devices to communicate wirelessly or otherwise with the physical DNFT exchange instrument 172. The network interface may be implemented via hardware (e.g., circuitry), software (e.g., executable code), or any combination thereof. Thus, the physical DNFT exchange instrument 172 can be configured to communicate and establish a communication session with the client system 103 and/or data processing system via network 101. Establishing a communication session between the physical DNFT exchange instrument 172 and the client system 103 can include establish a Bluetooth, NFC, WAN, or any short range communication mechanism or protocol. In various arrangements, the client system 103 can disable and enable the display features of the presentation element(s) of the physical DNFT exchange instrument 172 such that presentation of various elements (e.g., image of the NFT, balance, current limit) can be disabled or removed at any given time in response to a request by the client system 103. Furthermore, the presentation of various elements can be disabled or removed at any given by the physical DNFT exchange instrument 172 in response to losing connection to the client system 103. Additionally, DNFT exchange instrument printer 122 can include an output feed configured to print and dispense the physical DNFT exchange instrument 172.

Figure 2:
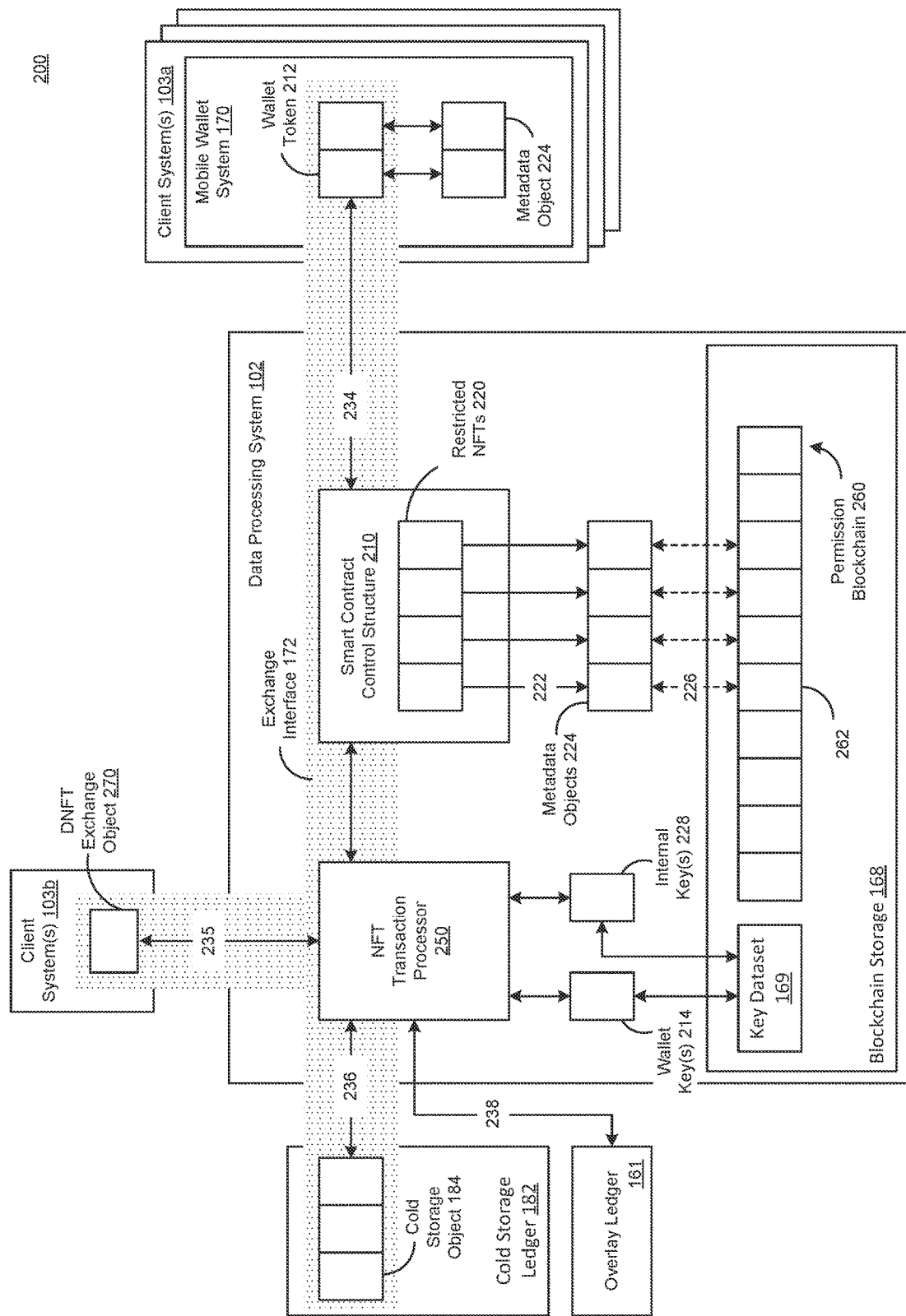
FIG. 2 depicts an example protection architecture, in accordance with present implementations.

FIG. 2 depicts an example protection architecture, in accordance with present implementations. As illustrated by way of example in FIG. 2, an example system architecture 200 can include at least the data processing system 102, the client system 103a, the client system 103b, the overlay ledger 161, the blockchain storage 168, the key dataset 169, the mobile wallet system 170, the exchange interface 172, the cold storage ledger 182, the cold storage object 184, a smart contract control structure 210, wallet tokens 212, wallet key(s) 214, one or more restricted NFTs 220, one or more metadata links 222, one or more metadata objects 224, one or more blockchain links 226, internal key(s) 228, a client link 234, a client link 235, a cold storage link 236, an overlay ledger link 238, an NFT transaction processor 250, a permission blockchain 260 with one or more blocks 262, and a DNFT exchange object 270.

The mobile wallet system 170 can include one or more NFTs and keys corresponding to a various accounts and linked with the client system 103a. For example, the mobile wallet system 170 can encapsulate one or more NFTs linked with the client system 103a within a secure container, and can include an interface compatible with the NFT transaction processor 250, the NFT exchange system 104, and the exchange interface 172. The mobile wallet system 170 can include wallet tokens 212. The wallet tokens 212 can each include a particular NFT and can correspond to particular metadata objects 224. An NFT of the wallet tokens 212 can be associated with a particular metadata object 224, and can be required to transmit output of the metadata object 224, transfer the metadata object 224 to another storage location, or any combination thereof, for example. Each of the wallet tokens 212 can indicate control of a particular metadata by a particular user linked with the mobile wallet system 170 via a cryptographic key or key pair.

The wallet key(s) 214 can include a key compatible with the wallet token 212. The wallet key(s) 214 can be stored in key dataset 169 and received by the token authenticator processor 312 via a wallet key transmission 304 (shown in FIGS. 3-4). The mobile wallet system 170 can execute a transaction or modify metadata of the wallet token 212 in response to detecting input including the wallet key 214. The wallet keys 214 can, for example, include a wallet public-private key pair, a wallet public key, or a wallet private key compatible with the wallet container 210. The mobile wallet system 170 can permit access to the wallet token 212 based on the wallet key(s) 214, for example, compatible with the encapsulation layer and operable to decrypt the encryption corresponding to the encapsulation layer.

The smart contract control structure 210 can include one or more instructions to restrict and transmit output of one or more of the restricted NFTs 220. The smart contract control structure 210 can correspond to an executable smart contract and can include a gateway component. The gateway component can include one or more instructions to restrict or prevent output of the restricted NFTs 220 in the absence of presence of one or more tokens compatible with the smart contract control structure 210. The smart contract control structure can include an encapsulation layer that (shown as smart contract control structure 210), for example, maintains the restricted NFTs in an encrypted state. The smart contract control structure 210 can permit access to the restricted NFTs based on a private key, for example, compatible with the encapsulation layer and operable to decrypt the encryption corresponding to the encapsulation layer. The gateway component can be compatible with and interface with the exchange interface 172, and the encapsulation layer can be integrated with the smart contract control structure 210. The smart contract control structure 210 can be registered to the blockchain 260 by a block link with the blockchain 260.

The restricted NFTs 220 can each include a particular NFT and can correspond to particular metadata objects 224. A restricted NFT 220 can be associated with a particular metadata object, and can be required to transmit output of the metadata object, transfer the metadata object to another storage location, or any combination thereof, for example. Each of the restricted NFTs 220 can indicate control of a particular metadata object of the metadata objects 224 by a corresponding metadata link of the metadata links 222. The metadata links 222 can include a reference, pointer, or the like, to or between each restricted NFT and each metadata object associated with that particular restricted NFT. The restricted NFTs 220 can have various aspects or characteristics, for example, that can correspond to the wallet tokens 212. For example, a restricted NFT among the restricted NFTs 220 can be associated with a type corresponding to or matching a type of the wallet token 212. The client link 234 can include a technical improvement of at least including a format, protocol, or the like compatible with the client system 103a, by detecting or identifying aspects or characteristics of the restricted NFTs 220.

An NFT of the restricted NFTs 220 can be transferred from or to the mobile wallet system 170, for example. For example, each of the restricted NFTs 220 can indicate control of a particular metadata by a particular user linked with the smart contract control structure 210 via the internal key 228. The internal key 228 can include a key compatible with and controlled by the data processing system 102. Transmission of the internal key 224 can be restricted by the data processing system 102 to within the data processing system 102. For example, the system internal key 224 can correspond to a "backup key" or "house key" that must be detected in order to activate processors or decrypt containers of the smart contract control structure 210. Thus, the internal key 224 can restrict authorization by the smart contract control structure 210 to the data processing system 102 environment.

The metadata objects 224 can each include a particular data or instructions. A metadata objects can correspond to a collections of executable instructions or data that can be finite. For example, a metadata object can include a video file corresponding to a limited number of instances of video metadata. For example, a metadata object can include an audio file corresponding to a limited number of instances of audio metadata. For example, a metadata object can include a metric that increases with limited capacity, such as a physical measurement a financial instrument valuation, a periodic output based on a physical or scarce property, or any combination thereof.

The exchange interface 172 can include a communication channel between one or more of the smart contract control structure 210, the NFT transaction processor 250, the wallet token 212 at the mobile wallet system 170, and the cold storage object 184 at the cold storage ledger 182 The exchange interface 172 can include an application programming interface compatible with the smart contract control structure 210 to detect the wallet key(s) 214 and internal key(s) 228 at the data processing system 102, the cold storage object 184 at the cold storage ledger 182, and the wallet token 212 at the mobile wallet system 170. At least the exchange interface 172 or the smart contract control structure 210 can execute one or more instructions to determine whether one or more of wallet key 214, internal key 228, the DNFT exchange object 270, and the wallet token 212 are compatible with the container 320 and/or smart contract control structure 210. The exchange interface 172 can include a wallet token 212, and a client link 234. The client link 234 can include a transmission path or communication path between the wallet token 212 and the smart contract control structure 210 by the exchange interface 172. At least the exchange interface 172 or the smart contract control structure 210 can detect the wallet token 212 via the client link 234.

The wallet token 212 can identify an NFT and can identify one or more characteristics linked with the NFT or corresponding to a request to transfer the NFT (e.g., deposit, withdrawal, update). For example, the wallet token 212 can include an identifier of the NFT, a hash of the NFT, an identifier of an NFT account linked with the NFT, an NFT account linked with the request to transfer the NFT, an identifier of a public-private key pair or any portion thereof, or any combination thereof. For example, the wallet token 212 can include an identification of a public-private key pair corresponding to a smart contract control structure of an owner of an NFT. In another example, the wallet token 212 can include an identification of a public-private key pair corresponding to a smart contract control structure of a buyer of an NFT. The client link 234 can transmit the wallet token 212 from the client system 103a or the mobile wallet system 170 to the data processing system 102 (in particular, the NFT transaction processor 250) or smart contract control structure 210.

The NFT transaction processor 250 can execute one or more actions with respect to various cryptographic keys, NFTs, containers, control structures, and smart contracts. For example, the NFT transaction processor 250 can modify links between various containers, control structures, NFTs, and smart contracts with various public-private key pairs. The transaction processor 250 can transfer public-private key pairs based on one or more operations of the cryptographic key processor 120, for example. The NFT transaction processor 250 can generate and modify one or more metrics corresponding to various NFTs, including wallet tokens 212 and restricted NFTs 220, based on one or more operations of the NFT feature processor 130 or the NFT metrics engine 140. The NFT transaction processor 250 can generate or modify one or more containers, NFT accounts, or smart contracts, based on one or more operations of the smart contract engine 150.

Additionally, the NFT transaction processor 250 can execute one or more actions with respect to generating cold storage objects 184 and storing the cold storage objects 184 in the cold storage ledger 182. In some arrangements, the NFT transaction processor 250 can establish an intermittent secure connection with the cold storage ledger 182 over the cold storage link 236. the NFT transaction processor 250 can also execute one or more actions with respect to generating NFT accounts for the overlay ledger 161, recording associations of restricted NFTs 220 with one or more NFT accounts of the overlay ledger 161, and updating the overlay ledger 161. In some arrangements, the NFT transaction processor 250 can establish a connection with the overlay ledger 161 over the overlay ledger link 238.

The permission blockchain 260, within the blockchain storage 168, can include at least one blockchain including one or more of the blocks 262. The permission blockchain 260 can be linked with one or more metadata objects 224, restricted NFTs 220, and smart contract control structures 210. The permission blockchain 260 can include a blockchain operated and controlled at the data processing system 102. The permission blockchain 260 can include a plurality of blockchains each corresponding to particular aspects of the links associated with the corresponding blockchains. The permission blockchain 260 can include blocks 262, and the key dataset 169 can include wallet keys 214, internal keys 228, and other keys such as cold storage keys. The blocks 262 can include or store links to one or more objects associated with the blockchain. The keys stored in the key dataset 169 can include a reference, pointer, or the like, to or between a block among the blocks 262 and the keys associated with that particular block. For example, an internal key 228 can include a reference, pointer, or the like, to or between a block among the blocks 262 and the internal key 228 associated with that particular block.

For example, the system can transfer, by the NFT transaction processor 250 and based on the scaled value of the first NFT, a second public and private key pair to the smart contract linked with a second scaled value of the first NFT and the first NFT. For example, the system can include the second scaled value of the first NFT corresponding to a difference between a quantitative value of the first NFT and the scaled value of the first NFT. For example, the difference can correspond to a value of the NFT that exceeds a value of a transaction identified by a request token. For example, the system can extract, by the NFT transaction processor 250 from a first metadata object 224 linked with the first NFT, a type of heuristic that indicates the type of the first NFT the second NFT satisfying the type of heuristic. For example, a type of heuristic can identify presence of pixels, video frames, or vector definitions, and can indicate that an NFT is linked with a metadata object having an image, video, or icon format. For example, a type of heuristic can identify presence of hashes, or asymmetric key pairs, and can indicate that an NFT has a hash type or an key-based linking property.

In some arrangements, the client system 103b may be a point-of-sale device or similar payment receival device configured to receive payment requests (e.g., from a digital or physical payment instrument) from a customer (e.g., operating a different client system 103). For example, client system 103 can be configured to accept payment cards (e.g., credit card, debit card, rewards card, tap card) or another payment instrument (e.g., token from a digital wallet, digital payment card) such as, but not limited to, the physical DNFT exchange instrument 172 or a digital DNFT exchange instrument. In general, the physical DNFT exchange instrument 172 or a digital DNFT exchange instrument can transmit information (e.g., identifier, expiration date, one-time code or token) unique to the physical DNFT exchange instrument 172 or a digital DNFT exchange instrument. In some arrangements, the client system 103b or the physical DNFT exchange instrument 172 or a digital DNFT exchange instrument can generate a DNFT exchange object 270 including DNFT exchange instrument information of the DNFT exchange instrument and exchange information (e.g., public address of the exchange system, routing information to receive payment, exchange system identifier, public-private key pair, and so on) of the one exchange system. In particular, the DNFT exchange object 270 can be used by the NFT transaction processor 250 to process exchanges between the customer presenting and using the physical DNFT exchange instrument 172 or a digital DNFT exchange instrument and the goods and/or services provider. Processing exchanges can include using current card network rails to transfer payment from the customer to the goods/service provider.

Additionally, the NFT transaction processor 250 can execute one or more actions with respect to receiving the DNFT exchange object 270 from client system 103b. Client system 103b can be a point-of-sale device or similar payment receival device configured to accept the physical DNFT exchange instrument 172 (e.g., via an NFC tap or swipe) and/or digital DNFT exchange instrument (e.g., from a short range communication between the client system 103b and another client system 103). In some arrangements, the NFT transaction processor 250 can establish a secure connection with the client system 103b over the client link 235. The exchange interface 172 can include a DNFT exchange object 270, and a client link 235. The client link 235 can include a transmission path or communication path between the DNFT exchange object 270 and the NFT transaction processor 250 by the exchange interface 172. At least the exchange interface 172 or NFT transaction processor 250 can detect the DNFT exchange object 270 via the client link 235. The container 320 can include one or more DNFT exchange instruments 332.

Figure 3:
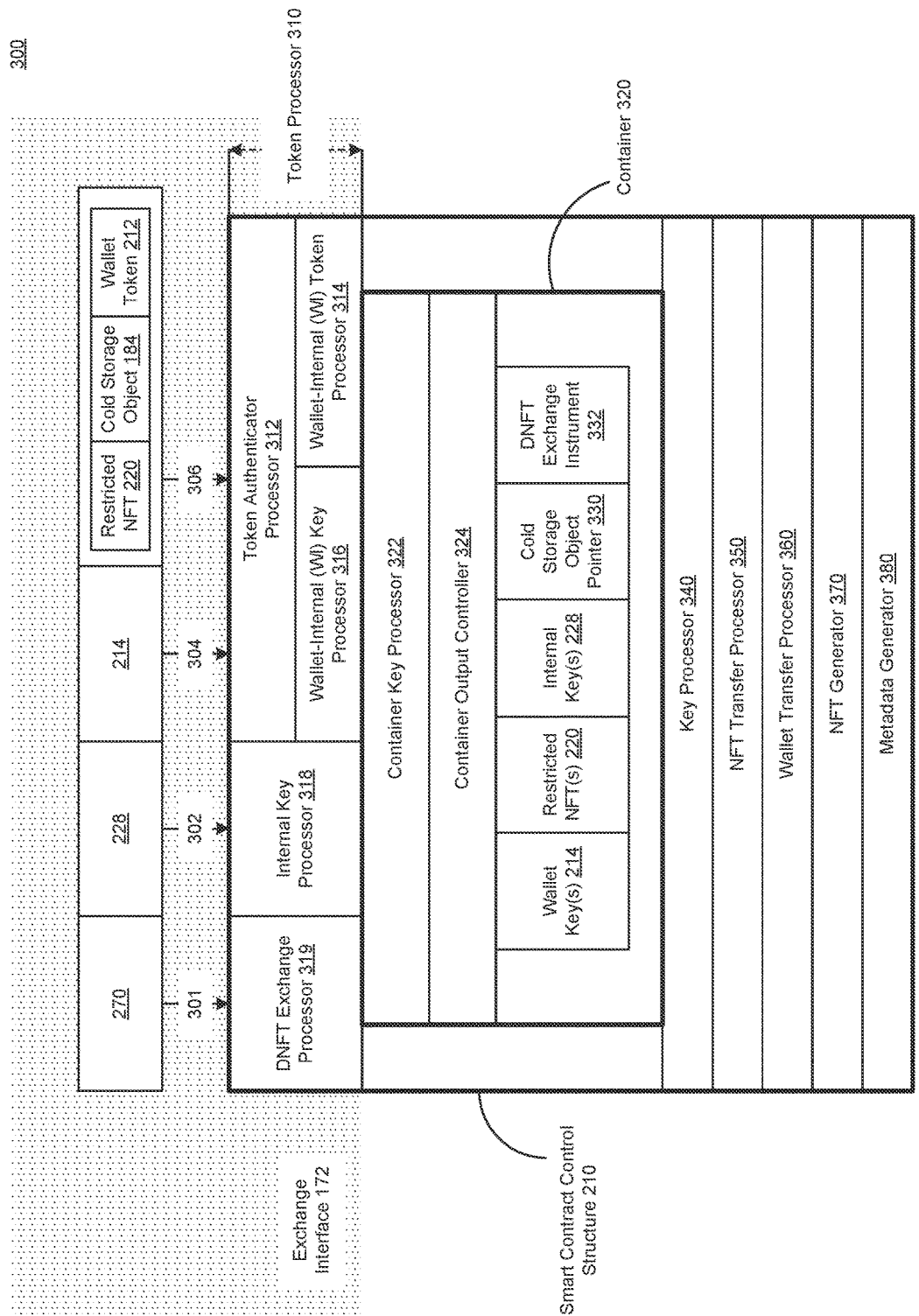
FIG. 3 depicts an example protection architecture, in accordance with present implementations.

FIG. 3 depicts an example protection architecture, in accordance with present implementations. As illustrated by way of example in FIG. 3, an example protection architecture 300 can include at least an exchange interface 172, a smart contract control structure 210, an internal key transmission 302, a wallet key transmission 304, and a token/object transmission 306, a token processor 310 including a token authenticator processor 312, a wallet-internal token processor 314, a wallet-internal key processor 316, and an internal key processor 318, a container 320, a key processor 340, an NFT transfer processor 350, a wallet transfer processor 350, a wallet transfer processor 360, an NFT generator 370, and a metadata processor 380

The internal key transmission 302 can be responsive to an action by the exchange interface 172 to transmit the internal key 228 to the smart contract control structure 210. The wallet key transmission 302 can be responsive to an action by the exchange interface 172 to transmit the wallet key 214 to the smart contract control structure 210. The token/object transmission 306 can be responsive to an action by the exchange interface 172 to transmit the wallet token 212, the restricted NFT 220, and/or cold storage object 184, to the smart contract control structure 210. That is, the token/object transmission 306 can be one or more of the wallet token 212, the restricted NFT 220, and/or cold storage object 184 received from one or more of the cold storage ledger 182, the blockchain storage 168, and/or the mobile wallet system 170, via the exchange interface 172.

For example, to sign a restricted NFT 220 in smart contract control structure 210 prior to an exchange, the token processor 310 (in particular, the token authenticator processor 312) may request, over the exchange interface 172, a cold storage object 184 from the cold storage ledger 182. The request the token processor 310 can pass or provide the cold storage object pointer 330. In the above example, the token processor 310 may establish an intermittent secure connection by disconnecting the data processing system 102 from the internet or any network connection prior to transmitting the request for the cold storage object 184. In another example, to make a deposit on the data processing system 102 the mobile wallet system 170 can transmit the wallet token 212 (and a wallet public key, wallet private key, and/or wallet public-private key pair) to the smart contract control structure 210 or to the NFT transaction processor 250 for processing the output. In the example when the NFT transaction processor 250 receives the wallet token 212 first, the NFT transaction processor 250 may verify, authenticate, or sign the wallet token 212 (or portions of the wallet token 212 such as the link or metadata object) prior to transmitting the wallet token 212 to the smart contract control structure 210. In yet another example, to make a withdrawal on the data processing system 102 the blockchain storage 168 and/or key dataset 169 can transmit a restricted NFT 220 (and an internal public key, internal private key, internal public-private key pair, and/or cold storage object 184) to the smart contract control structure 210 or to the NFT transaction processor 250 for processing the output. In the example when the NFT transaction processor 250 receives the restricted NFT 220 first, the NFT transaction processor 250 may verify, authenticate, or sign the restricted NFT 220 (or portions of the wallet token 212 such as the link or metadata object) prior to transmitting the restricted NFT 220 to the smart contract control structure 210.

Additionally, the token processor 310 can query the overlay ledger 161 for NFT account information associated with a restricted NFT 220 or wallet token 212. For example, in response to the token processor 310 receiving a restricted NFT 220 or wallet token 212 the token authenticator processor 312 can determine if an NFT account has been generated for the received restricted NFT 220 or wallet token 212. In the above example, if an NFT account has been created, the token processor 310 may update the overlay ledger 161 recording the token identifier with a particular NFT account. In yet the above example, if an NFT account has not been created, the token processor 310 may provide the overlay ledger 161 with information to generate an NFT account and record the token identifier with the newly generated NFT account The token processor 310 can communicate with, authenticate, and update various tokens and NFTs. The token processor 310 can include one or more interfaces corresponding to an API or a smart contract interface, for example. A smart contract interface can include one or more executable instructions integrated with a smart contract. The smart contract interface can execute instructions at the smart contract or triggered by the smart contract in response to detection of objects or conditions external to the smart contract. The token processor 310 can comprise at least a portion of a control structure of the smart contract. The token processor 310 can include a token authenticator processor 312, a wallet-internal token processor 314, a wallet-internal key processor 316, and an internal key processor 318.

The internal key processor 318 can detect the presence of the internal key 228 (e.g., internal public key, internal public-private key pair, internal private key), and can determine whether the internal key 228 is compatible with the internal key processor 318. The internal key processor 318 can be configured to be compatible with a particular internal key 228, or can be generated to be compatible with a particular internal key 228. For example, the internal key processor 318 can be integrated with or store a hash based on an internal key 228 and a hash processor operable to generate a hash based on any system internal key 228. For example, the internal key processor 318 can include a public key or a private key of a key pair of a particular internal key 228, and can authenticate at least a portion of the internal key 228 based on a hash or comparison with the portion of the internal key 228. The internal key processor 318 can generate a hash in response to detecting the presence of the internal key 228, and can determine whether the internal key 228 is compatible with the smart contract control structure 210, in response generating the hash, by comparing the generated hash with the stored hash. The internal key processor 318 can include logic to detect a internal key 228 passed to it, by, for example, a JSON object or a header argument.

The token authentication processor 312 can determine whether an NFT of the container 320 of the smart contract control structure 210 is compatible with an exchange (e.g., withdrawal, deposit, update). For example, the token authentication processor 312 can include one or more metrics indicating that NFTs having aspects or characteristics can be transferred to or from the smart contract control structure 210. For example, a particular NFT in the container 320 of the smart contract control structure 210 may be incompatible with a transfer (e.g., deposit, withdrawal) or restricted from transfer by a minting restriction. For example, the token authentication processor 312 can include or reference a transfer restriction linked with a minting restriction, and can block execution of a transfer of the NFT from or to the mobile wallet system 170 in response to detecting the minting restriction or transfer restriction. For example, the token authentication processor 312 can include or reference a transfer authorization linked with a minting parameter, and can permit or initiate execution of a transfer of the NFT from or to the blockchain storage 168 in response to detecting the minting parameter linked with the transfer authorization. For example, token authentication processor 312 can link with a smart contract control structure 210 and receive an identification of or reference to a particular NFT. The token authentication processor 312 can then determine one or more characteristics or aspects of an NFT associated with a request to transfer that NFT, in response to receiving a transmission from or via the mobile wallet system 170 and/or NFT transaction processor 250.

The token authenticator processor 312 can detect the presence of a fungible token or non-fungible token, and can determine whether the token is compatible with the smart contract control structure 210. The token authenticator processor 312 can be configured to be compatible with a particular fungible token, or can be generated to be compatible with a particular fungible token. The token authenticator processor 312 can be configured to be compatible with a plurality of tokens having a particular characteristic, or can be generated to be compatible with a plurality of tokens having a particular characteristic. A particular characteristic can include, for example, a particular identifier or portion of an identifier of a token. For example, the token authenticator processor 312 can be integrated with or store a hash based on a particular fungible token and a hash processor operable to generate a hash based on any fungible token. The token authenticator processor 312 can generate a hash in response to detecting the presence of the fungible token, and can determine whether the fungible token is compatible with the smart contract control structure 210, in response generating the hash, by comparing the generated hash with the stored hash. The token authenticator processor 312 can include logic to detect a fungible token passed to it, by, for example, an activation instruction from the exchange interface 172.

In some arrangements, the token authenticator processor 312 can authenticate links of NFTs (or other tokens) based on successfully accessing, via the link, the metadata object of the NFT. The link can be the TokenURI (a unique identifier of what the token "looks" like) or another link that can be provided to NFT lookup table, a Uniform Resource Locator (URL), a world-wide-web address, an internal network address, a Hypertext Transfer Protocol Secure (HTTPS), an Interplanetary File System (IPFS) hash, and so on. In various arrangements, authenticating the link can include scanning and/or analyzing an NFT exchange, such as NFT exchange system 104, to verify the received NFT is not stored on or being sold on the NFT exchange. In some arrangements, the token authenticator processor 312 can also collect on-chain data related to the NFT (or token) by accessing the previous public address (prior to transferring the NFT and encapsulating it within the smart contract control structure 210) and determine if the on-chain data (e.g., previous transaction history, owner, metadata) is consistent with the metadata of the received NFT.

The wallet-internal token processor 314 can detect the presence of the wallet token 212, restricted NFT 220, and/or cold storage object 184, and can extract one or more attributes, parameters, aspects, or values, or any combination thereof, from at least one of the wallet token 212, restricted NFT 220, and/or cold storage object 184. The wallet token processor 414 can be configured to be compatible with the wallet token 212, the restricted NFT 220, the cold storage object 184, the exchange interface 172, the NFT exchange system 104, and/or the mobile wallet system 170. Thus, the wallet token processor 414 can provide a technical improvement of direct communication between the data processing system 102, the mobile wallet system 170, the NFT exchange system 104, the cold storage ledger 182, and the overlay ledger 161. The wallet token processor 414 can include a token profile or exchange profile corresponding to a particular NFT exchange system and compatible with a particular token.

The wallet-internal token processor 314 can detect the presence of a semi-fungible token (or non-fungible token), and can determine whether the semi-fungible token is compatible with the wallet-internal token processor 314. The wallet-internal token processor 314 can be configured to be compatible with a particular semi-fungible token, or can be generated to be compatible with a particular semi-fungible token. The wallet-internal token processor 314 can be configured to be compatible with a plurality of tokens having a particular characteristic, or can be generated to be compatible with a plurality of tokens having a particular characteristic. A particular characteristic can include, for example, a particular identifier or portion of an identifier of a token. For example, the wallet-internal token processor 314 can be integrated with or store a hash based on a particular semi-fungible token and a hash processor operable to generate a hash based on any semi-fungible token. The wallet-internal token processor 314 can generate a hash in response to detecting the presence of the semi-fungible token, and can determine whether the semi-fungible token is compatible with the smart contract control structure 210, in response generating the hash, by comparing the generated hash with the stored hash. The wallet-internal token processor 314 can include logic to detect a semi-fungible token passed to it, by, for example, an activation instruction from the mobile wallet system 170.

The wallet-internal token processor 314 can also detect the presence of a fungible token, and can determine whether the fungible token is compatible with the wallet-internal token processor 314. The wallet-internal token processor 314 can be configured to be compatible with a particular fungible token, or can be generated to be compatible with a particular fungible token. The wallet-internal token processor 314 can be configured to be compatible with a plurality of tokens having a particular characteristic, or can be generated to be compatible with a plurality of tokens having a particular characteristic. A particular characteristic can include, for example, a particular identifier or portion of an identifier of a token. For example, the wallet-internal token processor 314 can be integrated with or store a hash based on a particular fungible token and a hash processor operable to generate a hash based on any fungible token. The wallet-internal token processor 314 can generate a hash in response to detecting the presence of the fungible token, and can determine whether the fungible token is compatible with the smart contract control structure 210, in response generating the hash, by comparing the generated hash with the stored hash. The wallet-internal token processor 314 can include logic to detect a fungible token passed to it, by, for example, an activation instruction from the mobile wallet system 170.

The wallet-internal key processor 316 can detect the presence of the wallet key 214, and can extract one or more metrics, parameters, aspects, or values, or any combination thereof, from the wallet token 212, cold storage object 184, and/or restricted NFT 220. The wallet-internal key processor 316 can be configured to be compatible with the wallet token 212, cold storage object 184, and/or restricted NFT 220, the exchange interface 172, the NFT exchange system 104, the mobile wallet system 170, the cold storage ledger 182, and/or the overlay ledger 161. Thus, the wallet-internal key processor 316 can provide a technical improvement of direct communication between the data processing system 102, the NFT exchange system 104, the mobile wallet system 170, the cold storage ledger 182, and the overlay ledger 161.

The container 320 can include a security layer that restrict access to one or more of the NFTs or cryptographic keys. The container 320 can include, for example, a security encapsulation that partially or completely encrypts one or more components of the container 320. The container 320 can include the wallet key(s) 214, restricted NFT(s) 220, internal key(s) 228, cold storage object pointer(s) 330, and DNFT exchange instrument(s) 332.

The container key processor 322 can detect the presence of a cryptographic key, and can determine whether the cryptographic key is compatible with the container 320. The container key processor 322 can obtain the cryptographic key from the wallet token 212, for example. For example, the wallet private key can be stored entirely within the wallet token 212. In another example, the container key processor 322 can obtain the cryptographic key from the restricted NFT 220 (stored within container 320 or received via the exchange interface 172). For example, the internal private key can be stored entirely within the restricted token 220. In another example, internal keys can be stored entirely within the internal key 228 (e.g., internal public key) to restrict output from the container 320 to the logical location corresponding to the internal key 228. For example, the cryptographic key can be stored partially within the system internal key 228 and partially within the wallet token 212 or restricted NFT 220, to restrict output from the container 320 to the logical location corresponding to the wallet key 214 or internal key 228 by a distributed key. In another example, the cryptographic key can be stored partially within the system internal key 228 (e.g., internal public key) and partially within the cold storage object 184 (e.g., internal private key), to restrict output from the container 320 to the logical location corresponding to the wallet key 214 or internal key 228 by a distributed key.

In some arrangements, the container key processor 322 can detect the presence of a private key or public key (e.g., wallet or internal), and can determine whether the key is compatible with the container 320. The container key processor 322 can obtain the key from one or more of the non-fungible token, a semi-fungible token or a fungible token, and can transmit the token to the wallet-internal token processor 314. For example, the key can be stored entirely within the restricted NFT 220, cold storage object 184, or wallet token 212. For example, the private key can be stored entirely within the restricted NFT 220, to restrict output from the container to the logical location corresponding to the restricted NFT 220.

The container output controller 324 can selectively transfer at least NFTs and cryptographic keys from and to the container 320 based on determinations from the container key processor 322. For example, the container output controller 324 can transfer an NFT to the container 320 in response to a determination that the cryptographic key is compatible with the container key processor 322. The container 320 can include any number or combination of zero or more NFTs and zero or more keys, and is not limited to the examples illustrated herein.

In some arrangements, the smart contract output controller 320 can selectively transmit output from one or more of the restricted NFTs 220 based on determinations from one or more of the internal key processor 318, the token authenticator 312, the wallet-internal token processor 314, and the wallet-internal key processor 316. For example, the container 320 can include a communication channel and a control structure to activate or deactivate the communication channel. The communication channel can communicatively couple the container 320 with a communication interface external to the smart contract control structure 210. For example, the smart contract output controller 210 can activate the communication channel in response to a determination that a restricted NFT 320 and a wallet token 212 are both compatible with the smart contract control structure 210.

The wallet keys 214 (e.g., wallet public-private key pair) can correspond to a cryptographic key pair linked with a particular NFT account and wallet token 212. For example, the wallet keys 214 can be used to "lock" and "unlock" the wallet token 212 on the mobile wallet system 170. In the above example, the mobile wallet system 170 can transmit the wallet token 212 and the wallet keys 214 when depositing the wallet token 212 at the data processing system 102. In some arrangements, an action can include transferring an NFT to a particular NFT account or smart contract. Transferring the NFT to a particular NFT account may include updating an entry in the overlay ledger 161 but not broadcasting the NFT to the permission blockchain 260. In another example, a deposit action can include registering an NFT to a particular NFT account on the overlay ledger 161 and broadcasting the NFT to the permission blockchain 260, or any combination thereof.

The internal keys 228 (e.g., internal public-private key pair) can correspond to a cryptographic key pair linked with a particular NFT account and restricted NFT 220. For example, the internal keys 228 can be used to "lock" and "unlock" the restricted NFT 220 in the smart contract control structure 210. In the above example, the smart contract control structure 210 can transmit the restricted NFT 220 and the internal keys 228 when withdrawing the restricted token 228 at the data processing system 102. In some arrangements, an action can include transferring an NFT to a particular NFT account or smart contract.

The key processor 340 can generate, transfer, and modify various cryptographic keys. The key processor 340 can transfer one or more of the account key pairs 214 and 228 to or from the container 320 of the smart contract control structure 210. For example, the key processor 340 can transfer a cryptographic key pair, a public key, a private key, a symmetric key, or any combination thereof, to or from the container 320 to indicate a change in control of a particular NFT account to the container 320. The key processor 340 can authenticate the container 320 to a particular NFT account in the overlay ledger 161 based on a key of the container 320. For example, the account key processor 340 can identify an NFT account associated with the internal keys 228 (e.g., internal public-private key pair). For example, the key processor 340 can transmit a hash based on the internal keys 228 to a mobile wallet system 170 associated with the NFT account, to authenticate the container 320 to the NFT account associated with the internal keys 228. The key processor 340 can generate a corresponding number of "internal keys" or "wallet keys" such as "public and private key pairs" that can control restrictions on output by the particular metadata object linked with the particular smart contract control structure 210 compatible with the particular token.

The NFT transfer processor 350 can transfer and modify various NFTs. The NFT transfer processor 350 can include an API compatible with the permission blockchain 260. The NFT transfer processor 350 can selectively add, modify, and delete blocks from the permission blockchain 260. The NFT transfer processor 350 can add, modify, and delete blocks in accordance with restrictions or interfaces of the permission blockchain 260, and can add, modify, and delete blocks independently of the restrictions or interfaces of the permission blockchain 260 at any portion or index of the permission blockchain 260. The NFT transfer processor 350 can transfer the restricted NFT 220 to or from the container 320 of the smart contract control structure 210. For example, the NFT transfer processor 350 can transfer an NFT in response to an indication by the key processor 340 that an NFT account is linked with and authorized to a particular NFT account.

As used herein, an "on-us exchange" or "on-us transaction" is an exchange of an NFT between NFT accounts of the overlay ledger 161. In some arrangements, the overlay ledger 161 can be shared with other data processing systems external or remote to the data processing system 102. For example, the other data processing system may be another financial institution or provider of NFT exchanges. In some arrangements, the NFT transfer processor 350 can transfer and modify the overlay ledger 161 based on receiving an exchange request between customers have an NFT account with the overlay ledger 161. Accordingly, the NFT transfer processor 350 can execute an on-us exchange by updating the overlay ledger 161 to record the new ownership of the NFT being exchanged.

The wallet transfer processor 360 can transfer and modify various NFTs. The wallet transfer processor 360 can include an API compatible with the mobile wallet system 170. The wallet transfer processor 360 can selectively deposit, withdraw, or update NFTs stored on the mobile wallet system 170. The mobile wallet system 170 can deposit, withdraw, or update NFTs in accordance with restrictions or interfaces of the mobile wallet system 170, and can deposit, withdraw, or update NFTs (or other tokens) independently of the restrictions or interfaces of the mobile wallet system 170 at any portion or index. The wallet transfer processor 360 can transfer the restricted NFT 220 to or from the container 320 of the smart contract control structure 210. For example, the NFT transfer processor 360 can transfer an NFT in response to an indication by the key processor 340 that a withdrawal or deposit is requested by the mobile wallet system 170.

The NFT generator 370 can generate one or more NFTs in accordance with a metadata object. For example, the NFT generator 370 can generate multiple NFTs based on a number of new metadata objects or NFTs indicated by an obtained token. For example, the NFT generator 370 can generate one or more NFTs each including a link or a reference to a parent (or primary) NFT (e.g., one restricted NFT 220) to identify a source NFT corresponding to the NFT minted by the NFT generator 370 (e.g., for a physical asset or a digital asset). For example, the NFT generator 370 can generate one or more NFTs each including a link or a reference to an NFT from which the new NFTs are minted. Thus, the NFT generator 370 can provide a technical improvement of validating a minting of an NFT based on a parameter embedded in the NFT. The parameter can include a hash of the parent NFT or the NFT from which the new NFTs are minted, for example. Generating an NFT and minting an NFT can be used interchangeably.

The NFT generator 370 can also generate one or more tokens in accordance with a NFT or control structure. For example, the NFT generator 370 can generate multiple tokens based on a number of new metadata objects or NFTs indicated by an obtained NFT token, and linked with respective smart contract control structures. For example, the NFT generator 370 can generate one or more content tokens each linked with a particular smart contract control structure 210 with which the respective token is compatible. The NFT generator 370 can modify and delete tokens linked with primary NFTs or parent smart contract control structures, to update control of a partial transfer of metadata object control. For example, the NFT generator 370 can create a token controlling 25% of shares of a physical or digital asset, and modify a token originally controlling 100% of the physical asset to link with a smart contract control structure controlling 75% of the physical asset. The NFT generator 370 can make the modification in accordance with an example for a change in control of 25% of a physical asset controlled by the original token holder.

The metadata generator 380 can generate one or more metadata objects in accordance with a received request with a proposed route and third-party data (e.g., various data sources). For example, metadata generator 380 can generate multiple NFTs based on a number of new metadata objects indicated by a withdrawal, deposit, or update from the mobile wallet system 170, and linked with respective smart contract control structures. For example, the metadata generator 380 can generate one or more metadata objects each linked with a particular smart contract control structure 210 by which the respective metadata object is controlled. The metadata generator 380 can modify and delete metadata objects linked with NFTs or smart contract control structures 210.

The metadata generator 380 can modify a quantitative value corresponding to an NFT. For example, a quantitative value corresponding to an NFT can indicate a value of fiat currency or MBC currency. The metadata generator 380 can modify the quantitative value of the NFT based on a determined value (such as from off-chain data) to generate a scaled quantitative value. For example, an NFT having a quantitative value of 10,000 denominated in USD can be scaled based on a determined value of 0.1 to 1,000. The NET scaler can perform any linear or linear transformation on a quantitative value, and is not limited to the example product transform discussed herein.

The DNFT exchange processor 319 can detect the presence of the DNFT exchange object 270 and can extract one or more attributes, parameters, aspects, or values, or any combination thereof, from the DNFT exchange object 270. The DNFT exchange transmission 301 can be responsive to an action by the exchange interface 172 to transmit the DNFT exchange object 270 to the smart contract control structure 210 or the NFT transaction processor 250. The DNFT exchange processor 319 can determine whether the DNFT exchange object 270 is compatible with the DNFT exchange processor 319. The DNFT exchange processor 319 can be configured to be compatible with a particular DNFT exchange object 270, or can be generated to be compatible with a particular DNFT exchange object 270. For example, the DNFT exchange object 270 can link with a smart contract control structure 210 and receive an identification of or reference to a particular NFT. The DNFT exchange processor 319 can then determine one or more characteristics or aspects of an NFT associated with a DNFT exchange object 270, in response to receiving a transmission from or via the client system 103 including a DNFT exchange object 270.

In some arrangements, the container key processor 322 can obtain and store one or more DNFT exchange instruments 332 from the DNFT exchange instrument printer 122 or DNFT exchange processor 319. Each DNFT exchange instrument 332 can include a plurality of internal states that can be dynamically updated in real-time in response to collecting, receiving, and analyzing off-chain data associated with one or more assets represented by one or more NFTs that collateralize the DNFT exchange instrument 332. Upon generation of an DNFT exchange instrument 332, the data processing system 102 (e.g., such as the DNFT exchange instrument printer 122) can set initial internal states based on various features of the one or more assets represented by one or more NFTs that are collateralized. In some arrangements, the container key processor 322 can detect the presence of a private key or public key (e.g., wallet or internal), and can determine whether the key is a DNFT exchange instrument 332. The container key processor 322 can obtain the DNFT exchange instrument 332 from a DNFT exchange object 270 and/or from the various systems described herein. Additionally, the container key processor 322 can update DNFT exchange instruments 332 based on receiving off-chain data associated with assets represented by the restricted NFTs 220.

Figure 4:
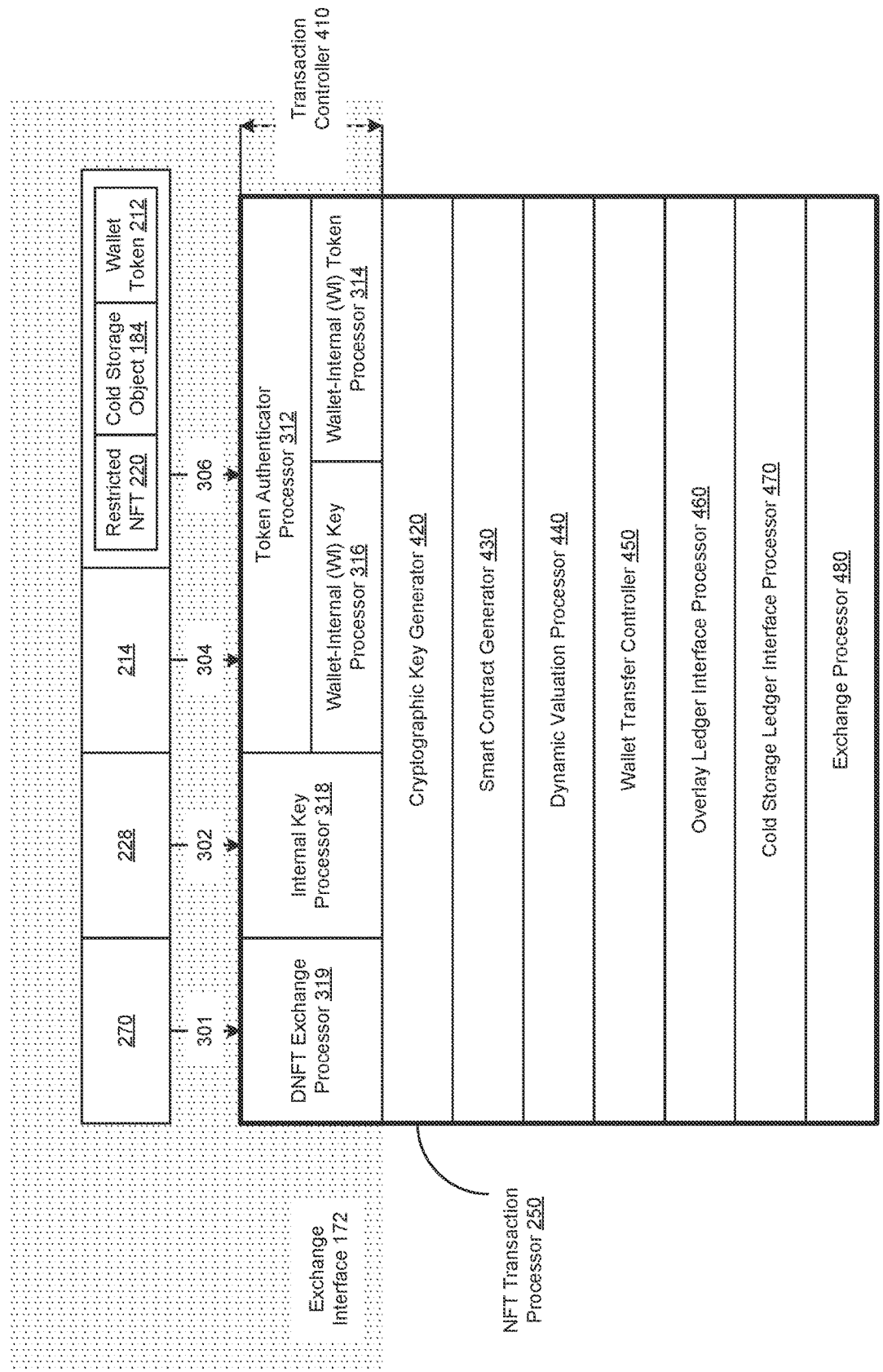
FIG. 4 depicts an example transaction processor, in accordance with present implementations.

FIG. 4 depicts an example NFT transaction processor, in accordance with present implementations. As illustrated by way of example in FIG. 4, an example NFT transaction processor 250 can include at least a transaction controller 410, a cryptographic key generator 420, a smart contract generator 430, a dynamic valuation processor 440, a wallet transfer controller 450, an overlay ledger interface processor 460, and a cold storage ledger interface processor 470.

The transaction controller 410 can detect a presence of a token (fungible, non-fungible, partially-fungible), and can transmit the token to a token processor (e.g., 310) compatible with that particular token. The transaction controller 410 can include the internal key processor 318, the token authenticator processor 312, the wallet-internal token processor 314, and the wallet-internal key processor 316. Each of the internal key processor 318, the token authenticator processor 312, the wallet-internal token processor 314, and the wallet-internal key processor 316 are described in detail with reference to FIG. 3.

The cryptographic key generator 420 can generate and modify cryptographic keys in communication with the cryptographic key processor 120. For example, the cryptographic key generator 420 can include one or more asymmetric or symmetric key generators, and can generate public-private key pairs. For example, a public-private key pair can include a public key configured to encrypt (or decrypt) in accordance with a particular transform process. For example, a public-private key pair can include a private key configured to decrypt (or encrypt) in accordance with a particular transform process compatible with the public key. The cryptographic key generator 420 can link the public-private key pair with any individual object or component. The cryptographic key processor 120 can link any public key or private key corresponding to the public-private key pair with any individual object or component. For example, the cryptographic key generator 420 can generate a key compatible with or linked with a particular identifier corresponding to a particular device, user, customer, account, system, token, or any combination thereof.

In some arrangements, the cryptographic key generator 420 can generate and modify one or more cryptographic keys associated with particular NFTs, digital wallets, or NFT accounts in communication with the smart contract engine 150. For example, the cryptographic key generator 420 can identify a public-private key pair corresponding to a wallet of an individual with an NFT account at the overlay ledger 161. The cryptographic key generator 420 can modify one or more keys of the public-private key pair to link with a different NFT, digital wallet, or NFT account, or any combination thereof.

In various arrangements, the modifying cryptographic keys in communication with the cryptographic key processor 120 can include rotating keys of an NFT. Keys can be rotated (public-private key pair, or just the public key or private key individually) based on a key rotation parameter, where the key rotation parameter can indicate when or what keys to rotate of an NFT. For example, the key rotation parameter can include, but is not limited to, rotate the keys for each NFT every hour, day, week, rotate the keys in response to a detection of a threat (e.g., cyberthreat such as a hack, fraudulent activity, data breach, suspected leak). The keys can be rotated based on a rotating key set of the key dataset 169. The rotating key set can be a set of public-private key pairs that can be used to lock and unlock an NFT. In some arrangements, the cryptographic key generator 420 can rotate or modify the NFT by transferring the NFT from the first internal address to a second internal address associated with the one of the plurality of internal public-private key in the rotating key set.

The smart contract generator 430 can generate and modify one or more smart contracts in communication with the smart contract engine 150. The smart contract generator 430 can execute instructions to generate or modify a cryptographic container (e.g., 320) or control structure (e.g., 210), to add or remove objects from a cryptographic container or control structure, and to execute various processors linked with or embedded within a smart contract. The smart contract generator 430 can generate a smart contract based on criteria of a transfer of an NFT or modification to one or more NFT accounts (e.g., stored in overlay ledger 161) linked with corresponding cryptographic keys. For example, the smart contract generator 430 can generate the smart contract control structure 210 to include one or more of the restricted NFTs 220, in response to determining that a request to transfer an NFT from the mobile wallet system 170 is valid in accordance with the token authenticator processor 312.

In some arrangements, the smart contract generator 430 can generate a smart contract and control structures of the smart contracts based on one or more of the wallet token 212 and the restricted NFTs 220. The smart contract generator 430 can generate a smart contract compatible with the identified restricted NFTs 220 and restricted to output. The control structure generator 430 can generate a control structure or container embedded within a smart contract, and control structures of the control structure, based on one or more of the wallet token 212 and/or restricted NFT 220. The smart contract generator 430 can also generate a smart contract control structure 210 encapsulating the identified restricted NFTs 220 and restricted to output. The smart contract generator 430 can generate a private key compatible with a control structure, based on one or more of the metadata objects of a restricted NFT 220. The smart contract generator 430 can generate a private key to encrypt the encapsulation including the restricted NFT 220 and restricted to output. The smart contract generator 430 can be compatible with the permission blockchain 260. The smart contract control structure 210 can modify the permission blockchain 260 by the blockchain links 226. The blockchain links 226 can include an API compatible with the permission blockchain 260.

The dynamic valuation processor 440 can receive, generate and modify a quantitative value of an NFT (e.g., restricted NFT 220). The dynamic valuation processor 440 can receive a quantitative value of an NFT that corresponds to an amount of fiat currency, MBC currency, central bank digital currency (CBDC) currency, digital currency, for example. The dynamic valuation processor 440 can periodically update or receive an updated quantitative value in accordance with a predetermined schedule, a triggering event, or any combination thereof. The dynamic valuation processor 440 can modify an allocation of an NFT in response to a determination that a quantitative value of the NFT has changed. For example, the dynamic valuation processor 440 can determine that a value of an NFT has increased by 10% to $1,100, and can increase an allocation of the NFT to a cryptographic key pair corresponding to a financial institution that corresponds to an increased allocation of $100 to the cryptographic key pair corresponding to a financial institution. For example, the dynamic valuation processor 440 can determine that a value of an NFT has increased by 10% to $1,100, and can increase an allocation of the NFT to a cryptographic key pair corresponding to a buyer of the NFT that corresponds to an increased allocation of $100 to the cryptographic key pair corresponding to the buyer of the NFT. The dynamic valuation processor 440 can obtain, from a template of the smart contract corresponding to the NFT, one or more rules or instructions or attributes controlling modification of allocation of an NFT in response to a change in valuation of the NFT. Thus, the dynamic valuation processor 440 can provide a technical improvement of automatically and dynamically modifying allocations of an NFT to multiple cryptographic keys based on criteria of particular smart contracts correspond to the NFT.

The wallet transfer controller 450 can instruct a container (e.g., 320) to execute a transfer of contents of the container or the smart contract control structure 210 to a container linked with a wallet key 214 or an internal key 228, in response to detecting or receiving an indication of a transfer event. The wallet transfer controller 450 can validate, by one or more of the internal key processor 318 or the wallet-internal key processor 316, that the container can be transferred. For example, the wallet transfer controller 450 can validate whether the container is located at the data processing system 102 by detecting presence of the internal key 228 (e.g., internal private key or internal public-private key pair). In response to detecting the presence of the internal key 228, the wallet transfer controller 450 can instruct a container to execute a transfer of contents of the container 320 or the smart contract control structure 210. In response to failing to detect the presence of the internal key 228, the wallet transfer controller 450 can instruct a container to block transfer of contents of the container 320 or the smart contract control structure 210. In response to detecting an absence of the internal key 228, the wallet transfer controller 450 can instruct a container to block transfer of contents of the container 320 or the smart contract control structure.

The overlay ledger interface processor 460 can generate and modify NFT accounts in communication with the overlay ledger 161. For example, the overlay ledger interface processor 460 can update an NFT account based on a withdrawal or transfer of a restricted NFT 220. In another example, the overlay ledger interface processor 460 can request an NFT account be created based on receiving an indication form the overlay ledger 161 an NFT account has not been created for the particular user or individual (e.g., associated with a unique identifier such as a SSN, first and last name, birthday, wallet public key). In various arrangements, the overlay ledger interface processor 460 can generate and modify NFT accounts in communication with the overlay ledger 161 when an NFT is transferred from a first NFT account to a second NFT account, or transferred from a wallet public address to an internal public address, or transferred from an internal public address to a wallet public address. In some arrangements, the overlay ledger interface processor 460 may not update the permission blockchain 160 even though an NFT has been transferred. For example, when two NFT accounts are stored in the overlay ledger 161 and the exchange is between the two accounts the overlay ledger interface processor 460 may query the overlay ledger 161 and update or modify the NFT accounts to record the transfer from the first NFT account to the second NFT account stored at the overlay ledger 161.

The cold storage ledger interface processor 470 can generate and modify one or more cold storage objects in communication with the cold storage processor 180. The cold storage ledger interface processor 470 can execute instructions to generate or modify a cold storage object (e.g., 184) or cold storage ledger 183, to add, update, or remove cold storage objects from the cold storage ledger 182, and to execute various processors linked with the cold storage ledger 182. The cold storage ledger interface processor 470 can generate a cold storage object 184 based on receiving a deposit or withdrawal of an NFT (or token) or modification to one or more NFT accounts (stored in overlay ledger 161). Generation of the cold storage object 184 can include storing the wallet private key from the deposit of the NFT or an internal private key of a restricted NFT 220 and at least a portion of the metadata of the metadata object 224 of the NFT. In some arrangements, the portion of the metadata can be removed or deleted from the NFT such either the NFT can be update or reminted (with a new or updated link) without the portion of the metadata removed. The cold storage ledger interface processor 470 may determine the metadata removed is protected data of the NFT. The protected data can be sensitive data the NFT stored as metadata. The update or reminted NFT can then in turn include metadata that is unprotected (e.g., non-sensitive). Accordingly, the cold storage object 184 can be a data structure configured to store a private key (e.g., wallet or internal) and protected data of an NFT. The cold storage ledger interface processor 470 can communicate with the cold storage processor 180 to store the cold storage object. Storing can include establishing an intermittent secure connection. Generating and using a cold storage object improves data security and storage by obfuscating the metadata of the NFT and storing the protected data of the NFT in an offline storage that can only be accessed using an intermittent secure connection. Therefore, aspects of the present disclosure address problems in privacy by maintaining the privacy of protected data stored as metadata in NFTs. By using a cold storage object, aspects of this technical solution can eliminate the exposure of protected data in metadata of NFTs over the network and in the data processing system 102, which is a significant improvement over other protection or obfuscation architectures implemented on NFTs. This not only protects data from compromise, but also protects private keys from exposure, which is a significant improvement to the security of NFTs and public-private keys generally. Thus, the creation of cold storage objects 184 and storage in a cold storage ledger 182 provides additional layers of security over the control structure security framework described herein.

The exchange processor 480 can process DNFT exchange instrument exchanges in communication with the overlay ledger 161, a payment network, and the client system (e.g., 103b). For example, the exchange processor 480 can update an NFT account based on the amount of the exchange (e.g., update current balance of the DNFT exchange instrument) indicated in the DNFT exchange object 270. In some arrangements, the exchange processor 480 is structured to process exchanges based on the received DNFT exchange object 270 from a goods or service provide (e.g., 103). For example, the received DNFT exchange object 270 can include routing numbers of the buyer and seller, account numbers of the buyer and seller, desired payment rails (e.g., wire, ACH, Zelle®, RTP, and so on), and any other information to effectuate a transfer from a buyer to a seller (e.g., cryptocurrency public key, cryptocurrency public and private key pair, credit card, debit card, card network, and so on). For example, the information may include a desired payment method by the buyer, which the exchange processor 480 uses to identify an issuer, contact the issuer, provide a destination routing and account number to the issuer, an amount for the transaction, a desired timing of the transaction (e.g., within one-day), etc. for the issuer to transfer the funds and any applicable fees. Accordingly, the received DNFT exchange object 270 can be utilized by the exchange processor 480 to process the exchanges from the buyer to the seller.

Figure 5:
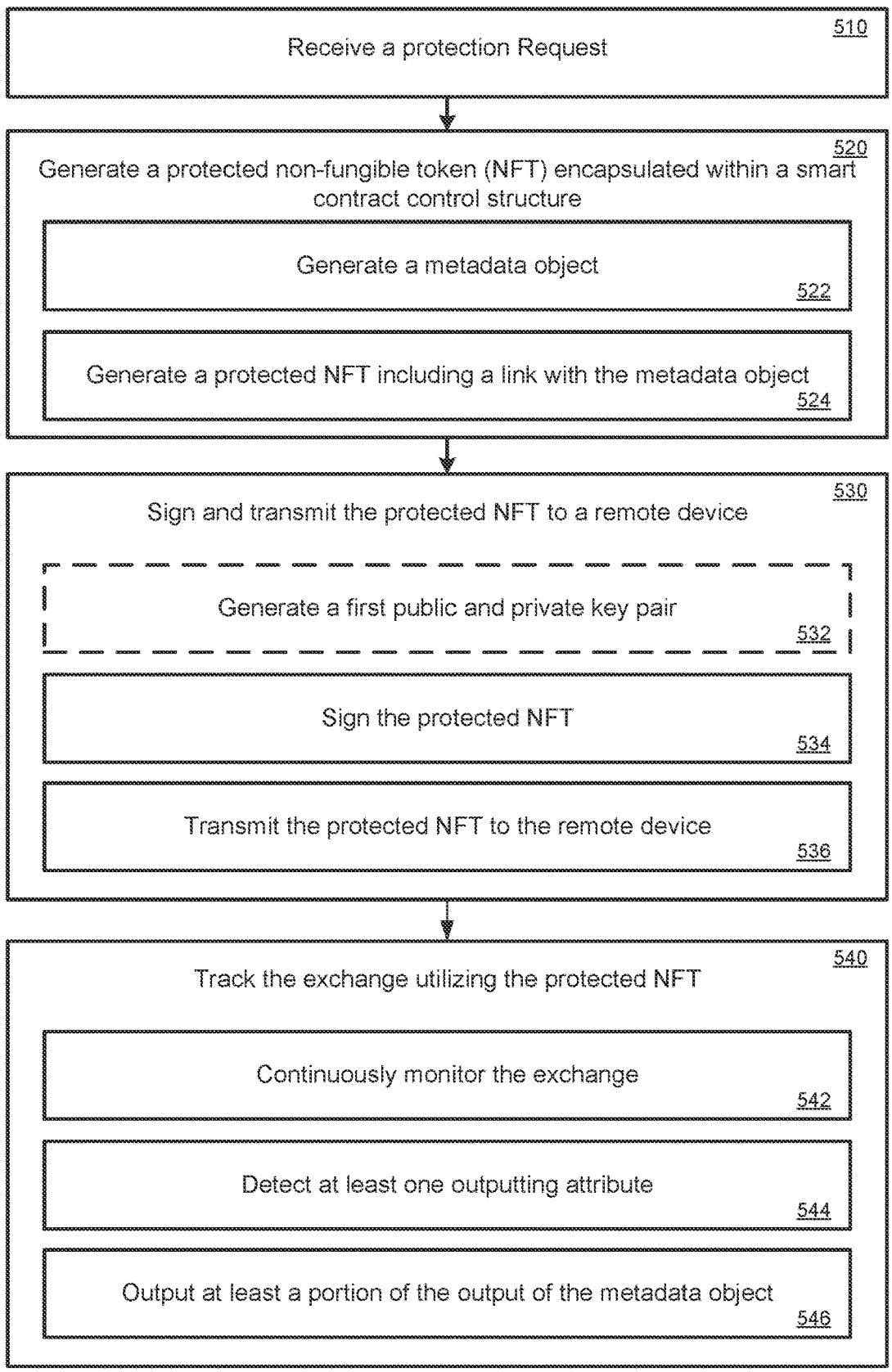
FIG. 5 depicts a method to protect asset exchanges utilizing non-fungible tokens (NFTs), in accordance with present implementations.

Referring now to FIG. 5, a flowchart for a method 500 to protect asset exchanges utilizing non-fungible tokens (NFTs) in accordance with present implementations. At least one of the example systems 100 and 200, or the example structures 300 and 400 can perform method 500 according to present implementations.

In broad overview of method 500, at block 510, the one or more processors (e.g., data processing system 102, etc.) can receive a protection request. At block 520, the one or more processors can generate a protected NFT encapsulated within a smart contract control structure (e.g., the smart contract control structure 210, etc.). At block 530, the one or more processors can sign and transmit the protected NFT to a remote device (e.g., a third-party device, one of the client systems 103, etc.). At block 540, the one or more processors can track the exchange utilizing the protected NFT. Additional, fewer, or different operations may be performed depending on the particular arrangement. In some embodiments, some, or all operations of method 500 may be performed by one or more processors executing on one or more computing devices, systems, or servers. In various embodiments, each operation may be re-ordered, added, removed, or repeated.

Referring to method 500 generally, method 500 provides improvements to authentication and data integrity by enabling tracking of asset (e.g., product and services) exchanges, including the movement of the asset through a supply chain. Thus, a protected NFT can be generated to represent the exchange. The asset may be at least one of a digital asset or a physical asset (e.g., at least one of a digital product or a physical product, at least one of a digital service or a physical service, etc.). In some examples, the asset is digital product, such as a software product. For example, the protected NFT can be used to verify whether a particular software version of the software product received from a provider matches a purchased software version of the software product purchased by a customer. In some examples, the asset is a physical product. For example, the protected NFT can be used to track the physical product based on collecting off-chain data to determine when an outputting attribute (e.g., geographic location, supply chain information, etc.) is satisfied, and when the outputting attribute is satisfied, output at least a portion of an output of metadata object associated with the protected NFT to the remote device. In some arrangement, the protected NFT represents a non-fungible token of a letter of credit.

In some examples, outputting the output of the metadata object can include outputting a fungible asset (e.g., a digital currency, a digital form of a fiat currency, a digital financial instrument for exchange, points associated with a rewards program, etc.) or a non-fungible asset (e.g., NFT, real estate, domain names, event tickets, in-game items like avatars, etc.) to the remote device. In some examples, outputting the output of the metadata object can include outputting a traded asset. The traded asset can include similar implementations to the asset described herein. For example, the traded asset can include, but is not limited to, a physical product, a digital product, a physical service, a digital service, or the like. In some arrangements, the exchange can include exchanging the asset for the traded asset, such that the customer is exchanging the traded asset for the asset of the provider.

In some arrangements, the off-chain data can be received via a data channel between the one or more processors and another third-party system (e.g., client system 103 or third-party device). Thus, the off-chain data can include, but is not limited to, movement information of the physical asset in a supply chain, location or geolocation data, weather data, trade regulations, pandemics, natural disasters, environment data (e.g., images, videos, biometrics, IoT data), political unrest, shipping data, and the like. By using the protected NFT with particular control structures, aspects of this technical solution can eliminate the exposure of sensitive data within a supply chain and in a computer networked environments, which is a significant improvement over other asset and data protection architectures. This not only protects sensitive assets and other data from compromise, but also protects entities from exposure, which is a significant improvement to the security of computing systems.

At block 510, the one or more processors can receive a protection request for an exchange. In particular, receiving can include receiving a protection request for an asset of the exchange. The protection request can be received from a client system 103, a third-party device, or another system or device connected to network 101. The protection request can include information such as, but not limited to, a proposed route of the asset where the proposed route includes a plurality of attributes (e.g., destinations, geographic locations, origin or starting location), asset information (e.g., type of asset (e.g., digital (e.g., software, application, digital service, etc.), physical (e.g., electrical device, art, furniture, physical service, etc.), digital and physical (e.g., software or application stored on data storage device, etc.)), images and videos of the asset, identifier such as a scannable code (e.g., QR, bar code, universal product code (UPC), international article number (EAN), a randomized pixel configuration, data matric, etc.), a token such as, a data payload that is transmitted via a short-range wireless communication (e.g., via NFC, Bluetooth, and/or other short-range wireless communication signals)), customer information (e.g., blockchain address, wallet address, public and private key pair, public key, private key, account information, location information, exchange history), and so on. In some examples, the asset is coupled to a physical tag, such as a scannable code, or a digital token to provide identifying information of the asset.

In some arrangements, the protection request is received by the one or more processors from a customer device (e.g., the client system 103, the third-party device, etc.), in response to determining that the customer initiated an exchange for at least one of services or goods from a provider. In some arrangements, the protection request is generated by the one or more processors in response to determining that the customer initiated an exchange for at least one of services or goods from the provider. In some examples, the provider may be the user of the remote device. The one or more processors may determine that the customer initiated the exchange based on off-chain data, receiving a notification (e.g., message, email, call, etc.) regarding the exchange, receiving documents associated with the exchange (e.g., price quotes, contracts, agreements terms, deadlines, discussions, proposals, etc.), or the like.

Referring to the plurality of attributes in more detail, each attribute can include or consist of a key value pair, where the key is the rule that can be satisfied and the value is the output associated with the protected NFT and/or the metadata object associated with the protected NFT. The plurality of attributes may include multiple types of attributes. In some arrangements, the plurality of attributes include a plurality of outputting attributes for outputting an output of the metadata object. For example, an outputting attribute of the plurality of outputting attributes could be a destination attribute where the key could be a destination on the proposed route and the value could be a destination for outputting (e.g., wallet address, blockchain address) the output of the metadata object upon satisfying the rule. In another example, the outputting attribute could be a timing attribute where the key could be a time the asset is delivered or arrives at a particular location on the proposed route and the value could be a digital currency value and a destination for transferring the digital currency (e.g., the output of the metadata object) upon satisfying the rule. In yet another example, the outputting attribute could be a quality attribute where the key could be an image or video of a physical asset and the value could the destination for outputting the output of the metadata object upon satisfying the rule. In yet another example, the outputting attribute could be an activation attribute where the key could be an activation code for activating a digital asset (e.g., software application) and the value could the destination for outputting the output of the metadata object upon satisfying the rule. The metadata control structures can analyze off-chain data and the attributes to determine if the value of the attribute is satisfied, and in turn output based on the key of the attribute.

As used herein, a "public and private key pair" (or "verification and signing key pair", or "key pairs") can be generated based on a cryptographic function (e.g., symmetric-key algorithms (such as DES, AES), asymmetric-key algorithms (Ed25519 signing, ECC), public-key algorithms (such as RSA), and so on) and be stored on a blockchain (e.g., blockchain storage 168) or storage (e.g., NFT storage 162). In some arrangements, each blockchain can maintain (e.g., store and allow access to keys) a key dataset such that the protected NFT may be associated with a public and private key pair stored in the key dataset. Each public and private key pair can be shared amongst multiple NFTs or can be unique to each digital asset on the ledger. In particular, the public key and the private key of the public and private key pairs can be mathematically related based on a mathematical algorithm, such that a private key be used to encrypt data (e.g., such as an asset) and the public key can be used to decrypt the data, or vice versa. In some arrangements, the digital asset may be configured based on a standardized language (e.g., key-value pairs, dictionaries, tables, mappings, pairings) for interpreting data (e.g., metadata objects).

In some arrangements, upon identifying or generating public and private keys of the protected NFT, the one or more processors can sign the protected NFT using one or more identified private keys and transmit the protected NFT or outputs with a public key (sometimes referred to herein as a "central public key") to the exchange interface 172. In particular, signing using the private key can include hashing (e.g., SHA1, MD5, etc.) the protected NFT and verifying using the public key can include decrypting the protected NFT using the public key to verify the digital signature came from the particular private key. In some arrangements, the keys may be symmetric (e.g., use the same key to sign/verify) or asymmetric (e.g., use different keys to sign/verify). For example, an algorithm (e.g., such as a hash algorithm) can be applied to a private key to generate a public key. Accordingly, public keys can be a cryptographic code that allows users and system described herein to receive the protected NFT and verify the protected NFT.

Additionally, the images and videos of the asset can be analyzed and/or interpolated by the one or more processors to create a model of the asset. The model can designate a plurality of metadata areas within the image or video of the asset. The model can be trained to identify matches between the asset and a captured image or video at a future time (e.g., when the asset arrives at an attribute of the proposed route). In particular, matches can be between metadata areas of the asset and the metadata areas of the captured image.

At block 520, the one or more processors can generate a metadata object (522) and generate a protected NFT including a link with the metadata object (524). In general, blocks 522 and 524 disclose a process for generating the protected NFT associated with the exchange. In some arrangements, the link, upon selection, can be configured to present an image or video of the asset and the link can be the destination or pointer to the storage location of the metadata object.

At block 522, generating can include generating a metadata object including metadata of the exchange and a plurality of outputting attributes for outputting an output of the metadata object. In some arrangements, the one or more processors can generate one or more metadata objects in accordance with a protection request for an exchange. The one or more processors can receive, collect, or obtain metadata of the asset including, but not limited to, video, scannable code, audio, text, any media or digital representation, public and private key pair, executable programs, or any combination thereof of the asset. Additionally, the one or more processors can receive, collect, or obtain outputting attributes (or rules) for outputting. In some arrangements, the outputting attributes include, but not limited to, geographic locations on the proposed route of the asset and a non-fungible or fungible value (e.g., designated output) to be outputted based on being present or reaching one or more geographical locations, geographic locations on the proposed route of the asset and the metadata (e.g., designated output) to be outputted based on being present or reaching one or more geographical locations, a destination attribute including rules (e.g., geographic location designations, timing requirements (e.g., was received within 3 days of shipping, was received within 5 days of shipping, was delayed at least once, delivered before a designate time of day, etc.), quality and quantity requirement (e.g., dimension of the asset, quantity of the asset, quantity of the parts of the asset), etc. for determining when the destination is achieved or reached and a designated output (e.g., output of the metadata object) upon reaching the destination. In some arrangements, the metadata includes a bill of lading. In some examples, the bill of lading can include tracking information relating to transit of the asset on the proposed route. In some arrangements, the tracking information is confirmed by a carrier (e.g., a representative of the carrier, a computing system of the carrier, etc.) responsible for transporting or transmitting the asset. In some example, the confirmation includes a physical and/or a digital signature associated with the bill of lading.

In some arrangements, the one or more processors can be configured to generate a control structure based on the attributes, wherein the control structure is stored as at least one of a smart contract, or in a block on an internal ledger. In some arrangements, one or more control structures can be generated based on the attributes that are executable to restrict output of one or more particular metadata objects. In particular, the one or more processors can obtain the attributes and generate a control structure corresponding to the attributes. For example, the one or more processors can generate a control structure to encapsulate the metadata object including the metadata of the exchange. The control structure can restrict access to the metadata object within the control structure, by an encapsulation layer that, for example, encrypts the metadata object within the control structure with a common encryption scheme. The encapsulation layer can control output of the metadata object within the control structure by decrypting the metadata object according to the common encryption scheme.

As used herein, a "smart contract control structure," "metadata control structure," and "control structure" may be a computer program (also known as a program, software, software application, script, or code) configured to combine one or more attributes of the exchange together to create a single control structure for the metadata object. In some arrangements, the one or more processors can implement and execute a control structure to output, append, or update the metadata object of the protected NFT to include one or more metadata, attributes, and conditions (e.g., smart contracts), fields, a value, and so on. The control structure can be written in any form of programming language, including compiled or interpreted languages, and/or declarative or procedural languages, and it can be deployed in any form, including as a stand-alone program or as a circuit, component, subroutine, object, or other unit suitable for use in a computing environment. A metadata object may, but need not, correspond to a file in a file system. A metadata object can be stored in a portion of a file that holds other programs or data (e.g., one or more scripts stored in a markup language document), in a single file dedicated to an NFT in question, or in multiple coordinated files (e.g., files that store one or more subsystems, sub-programs, or portions of code). A control structure can be deployed to be executed on one computer or on multiple computers that are located at one site or distributed across multiple sites and interconnected by a communication network. The processes and logic flows described in this specification can be performed by one or more programmable processors executing one or more control structures (or computer programs) to perform actions by operating on input data (e.g., off-chain data, provenance requests, etc.).

As used herein, the phrase "smart contract" generally refers to a self-executing code (e.g., in a ledger network or other system) that executes when a set of conditions that have been agreed upon by the parties of the smart contract are met. Although the FIGS. and specification generally discuss utilizing smart contracts on NFTs, the systems, methods, and apparatuses disclosed herein can also be used for a plurality of types of non-fungible or fungible assets, such as but not limited to commodities, common shares, options, dollar bills, fiat currency, digital currency, deeds, leases, wills, other exchanges, non-smart contracts, traditional legal contracts, financial disbursements, taxes, and other types of non-fungible or fungible assets parties use and exchange. Parties to the smart contract for NFTs or other types of non-fungible or fungible assets may be individuals, companies, organizations, entities, providers, and so on.

At block 524, generating can include generating, based on the metadata object, a protected NFT including a link with the metadata object, wherein the protected NFT is encapsulated within a control structure that restricts an output of the metadata object to a remote device remote from the one or more processors. In general, the one or more processors can generate (or mint) one or more non-fungible tokens linked to particular metadata objects and encapsulated within a control structure. The one or more processors can also generate a token corresponding to a particular metadata object or metadata objects. Generating and/or minting an NFT can include converting a physical asset or digital file/asset into a digital asset stored on a blockchain. Thus, the protected NFT can digitally represent the physical asset or a digital asset and can serve as proof of ownership and protection of a specific asset. In some arrangements, the protected NFT can digitally represent a guarantee of payment in exchange for the specific asset. In some examples, the protected NFT can be transmitted to a provider or a representative entity (e.g., financial institution, etc.) of the provider that owns or holds the specific asset. In some examples, the guarantee includes a legal contract. In some examples, the guarantee includes a confirmation of funds equal to or larger than a payment amount associated with the guarantee of payment. The protected NFT can be verified by anyone on a blockchain and the token ensures authenticity of the physical asset or digital asset. The protected NFT can store a data value composed of at least a token identifier and a contract number. The token identifier can be a unique set of characters (e.g., numbers, symbols, and letters) uniquely identifying the protected NFT. For example, token identifier #1 can be identified as "G8fNM64!", and token identifier #2 can be identified as "lkj93IOs." The contract number can be a unique set of characters (e.g., numbers, symbols, and letters) uniquely identifying the control structure used by the protected NFT in managing and executing the functionality such as restricting the protected NFT, outputting from the protected NFT, etc. For example, control structure #1 can be identified as "CS_00001", and control structure #2 can be identified as "CS_00002." Thus, the data value can be an aggregate of the two identifier, such as a cryptographic hash of the two identifiers (e.g., data value before hash "G8fNM64!CS_00001", after hash "DFCD 3454 BBEA 778B 712A 652G 336F 90B1 7D9A 46AF"), or encrypted (e.g., using RSA encryption, AES encryption, SHA encryption, DES encryption). In some arrangements, the data value can be the public key of the protected NFT used to decrypt the protected NFT and/or interface with the destination address on the blockchain.

In some arrangements, the one or more processors can hash (e.g., SHA1, MD5, etc.), using a cryptographic hash or another math-based function, the control structure (or contract number) to create a digital signature of the control structure which can be stored in the smart contract storage 166. The cryptographic hash of the control structure can be incorporated into the protected NFT to restrict functionality of the protected NFT and increase security of the protected NFT as a transfer of the protected NFT may include knowledge or access to the protected NFT prior to the outputting attributes being satisfied.

In some arrangements, the one or more processors can hash (e.g., SHA1, MD5, etc.), using a cryptographic hash or another math-based function, the protected NFT to create a digital signature of the protected NFT which can be stored in blockchain storage 168. The cryptographic hash of the protected NFT can allow users and system described herein to verify the protected NFT.

In some arrangements, alternative to or in combination of generating the protected NFT, the one or more processors can obtain a preexisting protected token and can assign the preexisting protected token to a particular metadata object or metadata objects. In some arrangements, the preexisting protected token can be an NFT and include similar implementations to the protected NFT as described herein. In other arrangements, the one or more processors can generate a non-fungible token that is unique against all other tokens generated by the one or more processors, a fungible token that can be generated or replicated an arbitrary number of times, and a semi-fungible token that can be generated or replicated a particular number of times below or meeting a particular replication threshold. One or more fungible tokens or semi-fungible tokens can, for example, be associated with a particular metadata object or the same metadata object. The one or more processors can access the NFT storage 162 to determine whether the replication threshold corresponding to a particular threshold is satisfied, and can block or forgo generation or replication of a token beyond or meeting the replication threshold in response to a determination that the replication threshold corresponding to a particular threshold is satisfied. For example, the NFT generator 370 can generate multiple NFTs based on a number of new metadata objects or NFTs indicated by an obtained preexisting token.

The output of the protected NFT (e.g., the output of the metadata object) can be restricted to a remote device (e.g., one of the client systems 103, third-party device, etc.) remote from the one or more processors. In some arrangements, the output is restricted until at least one or more outputting attributes of the control structures are satisfied and/or detected, at which an output can occur. In some arrangements, outputting can include releasing or transmitting a fungible value or asset from one digital wallet address (e.g., blockchain address) to a second digital wallet address. In various arrangements, outputting can include releasing or transmitting a non-fungible value or asset from one digital wallet address (e.g., blockchain address) to a second digital wallet address. The transferring and exchanging of fungible and non-fungible values performed or executed by the one or more processors, according to various illustrative arrangements, is described in U.S. patent application Ser. No. 17/528,352, filed Nov. 17, 2021, the entirety of which is incorporated by reference herein.

At block 530, the one or more processors can generate a first public and private key pair (532), sign the protected NFT (534), and transmit the protected NFT to the remote device (536). In general, blocks 532, 534, and 536 disclose a process for signing and transmitting the protected NFT.

At block 532, generating can include generating a first public and private key pair including a first public key and a first private key. In some arrangements, the one or more processors can generate one or more public and private key pairs in accordance with a protection request for an exchange. In some arrangements, the first public and private key pair may be generated using a secret factor associated with a user or party who initiated the protection request. The protection request may include the secret factor. In some arrangements, in response to receiving the protection request, the one or more processors may extract the secret factor from the protection request and generate the first public and private key pair by using the secret factor as an input to the cryptographic function or algorithm. In some examples, the secret factor includes a user identifier associated with an identity of the user or party. For example, the user identifier may include biometric data, account number, house address, business address, occupation, credit score, and the like, of the user or party. In some examples, the secret factor can include an old public key, an old private key, a password, a username, and the like. For example, the secret factor can be a salt or another data package stored in a protection request that can be used to determine and/or calculate the first public and private key pair. Additionally, the secret factor can be used in combination with an encryption key, hash code, or secret key, where the secret factor can act as a salt to the encryption key, hash code, or secret key to improve the security and protection of the first public and private key pair.

In some arrangements, the first public and private key pair may be a first internal public-private key pair for the protected NFT, wherein an internal public key of the internal public-private key pair identifies a first internal address of a plurality of internal addresses on a blockchain storage, and wherein the internal public-private key pair is stored in a rotating key set including a plurality of internal public-private key pairs.

In some arrangements, generating the internal public key of the public-private key pair is based on generating an additional public key and merging the wallet public key and the additional public key to derive the internal public key, and wherein merging includes executing a math-based function. In particular, executing a math-based function can include generating a concatenated public key based on executing a concatenation of the wallet public key and the additional public key and hashing, utilizing salting, the concatenated public key based on a hash function, wherein salting includes providing random data and the concatenated public key as input to the hash function. For example, the wallet public key can be "PiQ4+taCdgByW45d−3dfeE" and the additional public can be "581Gedd−56&45aHj45^3s!". In the above example, the wallet public key and the additional public key can be concatenated or merged together using a merging algorithm (e.g., PiQ4+taCdgByW45d−3dfeE (+) 581Gedd−56&45aHj45^3s!=PiQ4+taCdgByW45d−3dfeE581Gedd−56&45aHj45^3s!, or PiQ4+taCdgByW45d−3dfeE (x) 581Gedd−56&45aHj45^3s!=121932631137021795223746380111126 3526900 (e.g., string multiplication based on a multiplication table), and so on. In some arrangements, the concatenated public key can be saved as an internal public key (e.g., 228). In various arrangements, the concatenated public key can also be salted with additional random data (e.g., "12345" or "abcde") based on inputting the random data and the concatenated public key into the hash function to create the internal public key that has been salted. Salting can provide an additional layer of security to the public key. In various arrangements, the concatenation and salting can be performed on any key described herein, such as an internal private key.

At block 534, signing can include signing the protected NFT using at least one of the first private key of the first public and private key pair or a second public key, where the second public key is transmitted to the one or more processors by the remote device. In some arrangements, the second public key is part of a second public and private key pair. In some examples, the second public and private key pair is generated by a third-party system, the client system 103, the remote device, or the like. For example, the second public and private key pair may be generated by the provider via the remote device or an advising bank associated with the provider via the remote device or the third-party system, and in turn provided to the one or more processors for storing and/or signing. In particular, signing using the first private key can include hashing (e.g., SHA1, MD5, etc.) the protected NFT and decrypting the protected NFT using the first public key to verify the digital signature came from the particular private key (e.g., the first private key). Signing using the second public key can include hashing the protected NFT and verifying using the second private key and decrypting the protected NFT using the second private key to verify the digital signature came from the particular public key (e.g., the second public key). In some arrangements, the protected NFT is decrypted using the first public key or the second private key to activate the smart contract control structure 210 encapsulating the protected NFT.

At block 536, transmitting can include transmitting the signed protected NFT to the remote device. For example, the one or more processors may transmit the signed protected NFT to the client system 103 or the third-party system. In some examples, the one or more processors (e.g., the NFT transfer processor 350) may transfer the protected NFT from a first wallet address (e.g., wallet address of issuing bank, etc.) to a second wallet address (e.g., wallet address of provider, wallet address of advising bank, etc.). Transferring the protected NFT can include transmitting an internal private key of the protected NFT from the first wallet address to the second wallet address. In some examples, the one or more processors (e.g., the NFT transfer processor 350) may transfer the protected NFT from the system memory 160 (e.g., the NFT storage 162, etc.) to the client system 103 (e.g., the mobile wallet system 170, etc.). Transferring the protected NFT can include transmitting the internal private key of the protected NFT from the system memory 160 to the client system 103. In some arrangements, the remote device is connected to the network 101, and the remote device and the one or more processors communicate via secure data channel. In some examples, the secure data channel includes file transfer protocol (FTP) or secure file transfer protocol (SFTP).

At block 540, the one or more processors can continuously monitor the exchange (542), detect at least one outputting attribute (544), and output at least a portion of the output of the metadata object (546).

At block 542, monitoring can include continuously monitoring the exchange based on collecting off-chain data from one or more off-chain data feeds. In some arrangements, the one or more processors can establish, utilizing an application programming interface (API), a data feed associated with the attributes and can monitor the data feed including executing API calls with the API, where the API calls return off-chain data (e.g., geographic locations, approximate geographic locations, user interactions with the physical or digital asset in the environment, humidity or temperature of the environment the physical or digital asset, or other characteristics/environmental data of the environment or the physical or digital asset). In some arrangements, the off-chain data can be selectively received based on the attributes of one or more control structures of the protected NFT. For example, the one or more processors may query a physical tag (e.g., sensor or GPS tracker) on the physical asset (e.g., 103, etc.) for geolocation location information based on attribute X of control structure A. In another example, the one or more processors may query a news feed (e.g., 103, etc.) for environment information (e.g., including temperature, humidity, and altitude) based on attribute Y of control structure B. In yet another example, the one or more processors may query John Doe's mobile device (e.g., 103, etc.) for recent geographic locations of the mobile device based on attribute Z of control structure C. Additionally, off-chain data can include digital asset information (e.g., source code, version, other features, or content) or physical asset information (e.g., images, videos, audio, or other content) received from a client system (e.g., 103, etc.) or any other computing device.

In general, off-chain data can be data collected and generated by one or more devices and/or systems (e.g., the client system 103, the third-party system/device, or other data sources) in system 100 (e.g., computing environment). That is, off-chain data can be data detected from sources external to the data processing system 102 (e.g., data not stored in 161, 162, 166, 168). The off-chain data can include, but is not limited to, network or virtual off-chain data, physical or natural off-chain data, or social off-chain data. The one or more devices and/or systems described herein can use one or more input devices to collect and aggregate the off-chain data. For example, network or virtual off-chain data can include, but is not limited to, IP addresses, MAC addresses, network scanning data, physical asset or digital asset network information, governmental data (e.g., FBI databases, CIA databases, COVID-19 databases, No Fly List databases, terrorist databases, vulnerability databases, and certificate databases), network packets, host name, network addresses, communication protocols, interactions with other networks or devices (e.g., physical asset scanned by device on a particular network), historical exchange data (e.g., previous exchanges of the NFT, digital currency, or physical asset), historical route data (e.g., supply chain data), documents, agreements, smart contracts, ledger information, shipment information (e.g., arrival time, arrival location, departure time, departure location, etc.), movement of ships (e.g., route, departure time, estimated departure time, arrival time, estimated arrival time, departure location, planned departure location, arrival location, planned arrival location, etc.), movement of planes, movement of vehicles, and so on. In another example, physical or natural off-chain data can include, but is not limited to, biometric data (of users or individuals interacting with the physical or digital asset, e.g., biological data such as, fingerprint, iris/retina, hand geometry, facial geometry, DNA, and so on, and behavioral data such as, gait, gesture, keystroke dynamics, speech pattern, foot movement pattern, etc.), weather conditions (e.g., of the proposed route, at particular locations based on previous geographic information of the physical asset), geographic locations (e.g., latitude and longitude, triangulation, approximate location), and so on. In yet another example, social off-chain data can include, but is not limited to, social media data (content depicting or capturing the physical or digital asset, or text in timelines or other textual content discussing the physical or digital asset, such as on, Facebook™, Twitter™, Snapchat™, and TikTok™), news feed data (e.g., articles, breaking news, and television content including information or data about the physical or digital asset), and so on.

In some arrangements, the one or more processors can establish, utilizing an application programming interface (API), a data feed between the one or more processors and the one or more devices and/or systems. The one or more processors can monitor the data feeds including executing API calls with the API, where the API calls return the off-chain data, and in turn analyze the off-chain data to detect an attribute has been satisfied (block 544). In various arrangements, the one or more processors can receive, collect, and/or scan off-chain from a plurality of data channels. Each data channel of the plurality of data channels may be communicatively connected to the one or more processors via a data channel communication network such that each device connected to the data channel can be a computing device that can store, generate, and collect data. Further, the one or more processors can also collect off-chain data by querying a plurality of data sources.

At block 544, detecting can include detecting, by the control structure, at least one outputting attribute of the plurality of outputting attributes is satisfied based on the off-chain data. The outputting attributes (sometimes referred to herein as parameters) can govern the modification, generation, and output of the metadata objects, fungible/non-fungible values, or fungible/non-fungible assets associated with the protected NFT. The protected NFT may include a plurality of outputting attributes, where each outputting attribute can include rules (described above as a key of the key value pair) for restricting the output, and satisfying the rules for output (described above as a value of the key value pair) can be determined by the metadata control structures. In some arrangements, the one or more processors can detect the at least one outputting attribute is satisfied based on the control structure executing instructions and determining the off-chain data received satisfies the at least one outputting attribute (e.g., in particular a value of the key value pair of the attribute).

In some arrangements, the at least one outputting attribute may include the asset reaching a specific destination (e.g., geographic location, IP address, MAC address, etc.), based on off-chain data. In some arrangements, the at least one outputting attribute may include a period of time passing, where the period of time starts in response to transmitting the protected NFT to the remote device. In some arrangements, the at least one outputting attribute may include a redemption of the asset, based on off-chain data. For example, redemption of a software application (e.g., digital asset) may include redeeming a license code of the software application.

In some arrangements, the at least one outputting attribute may include verifying authenticity of at least a portion of the asset of the exchange. Verifying authenticity can include cross-referencing the detected off-chain data with data stored by the one or more processors such as, but not limited to metadata of the asset (e.g., the physical asset and/or the digital asset). For example, the barcode (e.g., off-chain data) of the physical asset could be scanned at a location along the proposed route, and the scanned barcode can be cross-referenced against the original barcode of the physical asset to determine a match. In the following example, if the scanned barcode matches the original barcode the physical asset can be verified. In another example, the source code or version of the digital asset could be received, and the received source code or version can be cross-referenced against the original source code or version of the digital asset to determine a match. In the following example, if the received source code or version matches the original source code or version the digital asset can be verified. In yet another example, the quantity of components of the asset could be received, and the received quantity can be cross-referenced against the original quantity of components of the asset to determine a match. In the following example, if the received quantity matches the original quantity, the asset can be verified.

In some arrangements, when the off-chain data includes image(s) or video(s), verifying authenticity and/or quality of at least a portion of the asset can include modeling the off-chain data. In particular, the model can generate a content area percentage match for each content area of the asset. For example, the asset may include 9 content areas, and upon receiving the captured image, the one or more processors can designate 9 content areas of the captured image (e.g., entire or portion of the captured image) and input each content area into the model and determine a content area percentage match with the corresponding content area of the asset. In another example, the one or more processors can receive a first digital representation (e.g., off-chain data) of the asset, wherein the first digital representation is at least one of an image, a scannable code, a video, or data received from a communication interaction (e.g., from the remote device, client system 103, etc.). In the following example, the one or more processors can analyze or model the first digital representation based on collecting one or more content areas of the first digital representation and cross-referencing the one or more content areas with a second digital representation stored in the metadata of the asset. Thus, captured images and video can be received and inputted into the trained model (e.g., artificial intelligence (AI), machine learning, neural network, linear regression, estimator, image recognition model (IRM)). The model can output a prediction if the captured images or video match the asset (e.g., match, no-match, partial match) or a prediction indicating a percentage of match (e.g., 75% likely it is a match, 89% likely it is a match, and so on). Additionally, the model can also measure the quality of the asset such that a match and quality of the asset can be assessed. For example, the model can also, in response to an input of an image or video, can analyze the content areas to determine if the quality of the captured content areas of the asset is of sufficient quality (e.g., no environmental conditions such as water damage or rust, no excessive temperature exposure (e.g., burst capacitors indicating the physical asset was exposed to excessive heat for a period of time), no dents or noticeable marks on the asset, etc.).

In some arrangements, at least one of the plurality of attributes (e.g., the at least one outputting attribute, other attributes described herein, etc.) comprises a dynamic attribute that is configured to change based on at least a portion of the off-chain data. In some examples, the dynamic attribute may be of the at least one outputting attribute. For example, the dynamic attribute may change via the one or more processors in response to determining that the at least the portion of the off-chain data is associated with bad weather conditions on the proposed route, stricter trade regulations in countries within the proposed route, pandemics, natural disasters in areas within the proposed route, political unrest in the countries or states within the proposed route, and the like.

At block 546, outputting can include, in response to detecting the at least one outputting attribute is satisfied, outputting at least a portion of the output of the metadata object to the remote device. In some arrangements, in response to detecting the at least one outputting attribute is satisfied, the one or more processors output an entirety of the output of the metadata object to the remote device. In some arrangements, each of the plurality of outputting attributes is associated with an output level of a plurality of output levels. Each of the output levels may correspond to an output portion, amount, or fraction of the output of the metadata object. In some examples, a first outputting attribute may be associated with a first output level that corresponds to 50% of the output of the metadata object. In this example, in response to detecting the first outputting attribute is satisfied, the one or more processors output 50% of the output (e.g., 5 bitcoin of the 10 bitcoin exchange, $800,000 digital dollars of the $1,600,000 digital dollar exchange, 15 NFTs of the 30 NFT exchange, 5 NIL contracts of the 10 NIL contracts, etc.) of the metadata object to the remote device. In some examples, a second outputting attribute may be associated with a second output level that corresponds to 10% of the output of the metadata object. In this example, in response to detecting the second outputting attribute is satisfied, the one or more processors output 10% of the output of the metadata object to the remote device.

In some arrangements, the one or more processors receive the protected NFT from the remote device, and, in response to receiving the protected NFT, authorize outputting the output of the metadata object (e.g., entirety of the output of the metadata object, rest of the output of the metadata object, etc.) to the remote device. In some examples, the at least one outputting attribute includes the one or more processors receiving the protected NFT from the remote device, such that the one or more processors output an entirety of the output of the metadata object in response to the at least one output attribute being satisfied. In some examples, a second outputting attribute includes the one or more processors receiving the protected NFT from the remote device. For example, the one or more processors output a first portion of the output of the metadata object in response to determining that the at least one output attribute is satisfied and output a second portion of the output of the metadata object (e.g., rest of the output of the metadata object) in response to determining that the second output attribute is satisfied.

In some arrangements, in response to outputting the at least the portion of the output of the metadata object or an entirety of the output of the metadata object to the remote device, the one or more processors may receive the protected NFT from the remote device. The remote device may be a first remote device associated with the provider. In some arrangements, in response to receiving the protected NFT, the one or more processors may transmit the protected NFT to a second remote device associated with the customer. The customer may store the protected NFT on to the mobile wallet system 170 associated with the second remote device or a private ledger in communication with the second remote device.

In some arrangements, the one or more processors may verify the user of the remote device before the user can access the protected NFT. In some examples, the one or more processors generate a token-gated access, where a specified token is required to provide the user of the remote device with access to the protected NFT. For example, the one or more processors may be configured to receive and verify a security token from the remote device. The one or more processors may utilize the security token to verify a user of the remote device. The security token may include the user identifier. The one or more processors may compare the security token to a recorded security token. The recorded security token includes a recorded user identifier associated with the user. The recorded user identifier may have similar implementations to the user identifier. In some arrangements, the recorded security token is stored in the metadata object of the exchange. In some arrangements, the system memory 160 includes a whitelist that includes multiple recorded security tokens that include the recorded security token. In some examples, the whitelist identifies users with token-gated access via the recorded security tokens. In some arrangements, the recorded security token is included in the protection request. In response to determining that the security token matches the recorded security token, the one or more processors may authorize the user of the remote device to access at least a portion of the protected NFT via the remote device.

In some arrangements, the security token may be signed by the second private key and verifying can be based on utilizing the second public key to decrypt the signed security token. In some arrangements, the signed security token may be used in verifying the security token. For example, using an RSA encryption, the one or more processors can (1) calculate a hash of the recorded security token, and (2) decrypt the signed security token using the public key to produce a hash. If the two hashes are identical, the one or more processors can verify the security token was signed by the user via the remote device. Alternatively, if the two hashes do not match, the security token does not match the recorded security token. In various arrangements, instead of using RSA encryption, the security token can be signed and verified using AES encryption, SHA encryption, DES encryption.

In some arrangements, the access of the protected NFT is controlled by the one or more processors via the control structure. In some arrangements, the metadata object of the protected NFT may include an access attribute that is satisfied in response to the one or more processors determining that the security token matches the recorded security token. In response to determining that the access attribute is satisfied, the one or more processors authorize the user of the remote device to access at least a portion of the protected NFT (e.g., metadata object of the protected NFT) via the remote device.

In some arrangements, in response to determining that the security token does not match the recorded security token, the one or more processors may deny the user of the remote device access to the protected NFT via the remote device. In some arrangements, in response to determining that the security token does not match the recorded security token, the one or more processors retrieve the protected NFT from the remote device and/or burn the protected NFT.

In some arrangements, the security token and the corresponding recorded security token are associated with a first access level. The first access level may be part of multiple access levels, where each access level of the multiple access levels corresponds to specified access power, permissions, rights, and the like, for the protected NFT. Access may include viewability, transferability, salability, writtenability, and the like, of the protected NFT. For example, the first access level may correspond to full viewing, transferring, selling, and writing access to the protected NFT. A second access level of the multiple access levels may correspond to partial viewing access to the protected NFT and no transferring, selling, or writing access to the protected NFT. In some arrangements, the security token and the recorded security token are NFTs, such that the security token is a security NFT and the recorded security token is a recorded security NFT.

In some arrangements, the plurality of attributes of the metadata object of the protected NFT may further include a plurality of output preventing attributes for preventing output. In some arrangements, the one or more processors may be configured to detect, by the control structure, at least one output preventing attribute of the plurality of output preventing attributes is satisfied based on the off-chain data. In response to detecting the at least one output preventing attribute is satisfied, the one or more processors may prevent outputting the output of the metadata object to the remote device.

In some arrangements, the at least one output preventing attributes of the plurality of output preventing attributes may include the user identifier of the user of the remote device matching a blacklisted user identifier. In some arrangements, the blacklisted user identifier is associated with an identity of a blacklisted user with a fraudulent exchange history. The fraudulent exchange history may be included in the off-chain data. In some examples, the fraudulent exchange history may be included in the off-chain data by a government entity (e.g., Federal Bureau of Investigation, Internal Revenue Service, etc.), a financial institution, a financial technology company, a credit bureau, and the like. In some arrangements, the at least one of the plurality of output preventing attributes may include a location of the user, determined via a location of the remote device, matching a blacklisted location. The blacklisted location may identify a sanctioned location. The sanctioned location may be included in the off-chain data. In some examples, the sanctioned locations are included in the off-chain data by a government entity (e.g., Office of Foreign Assets Control, etc.), and the like. The blacklisted location may identify an area with fraudulent exchange history, high crime, unethical trade, or the like.

In some arrangements, the at least one output preventing attribute may include not verifying authenticity of at least a portion of the asset of the exchange. Checking authenticity of at least a portion of the asset of the exchange with respect to the at least one output preventing attribute may have similar implementations as described herein with respect to the at least one outputting attribute, where the at least one output preventing attribute is satisfied in response to not verifying authenticity of at least a portion of the asset of the exchange. For example, if the scanned barcode does not match the original barcode, the physical asset cannot be verified (e.g., the at least one output preventing attribute is satisfied). In another example, if the received source code or version does not match the original source code or version, the digital asset cannot be verified. In yet another example, if the received quantity does not match the original quantity, the asset cannot be verified. In another example, if the prediction of the trained model is no-match, partial match, or a low percentage of match, the asset cannot be verified. In some arrangements, a low percentage of match is 75% or lower, 50% or lower, 25% or lower, or the like, depending on requirements set by the protection request. In some arrangements, the at least one output preventing attribute may include a quality of at least a portion of the asset of the exchange being insufficient. For example, if the quality of the captured content areas of the asset is of insufficient quality, the least one output preventing attribute is satisfied.

In some arrangements, the plurality of attributes of the metadata object of the protected NFT may further include a plurality of burning attributes for burning the protected NFT. In some arrangements, the one or more processors may be configured to detect, by the control structure, at least one burning attribute of the plurality of burning attributes is satisfied based on the off-chain data. In response to detecting the at least one burning attribute is satisfied, the one or more processors may burn the protected NFT. In some arrangements, the one or more processors may retrieve the protected NFT from the remote device before burning the protected NFT. In some examples, the one or more processors may retrieve the protected NFT from the remote device using a private key to the wallet address of the remote device. In other examples, the one or more processors may retrieve the protected NFT from the remote device by receiving the protected NFT from the remote device.

In some arrangements, burning the protected NFT may include the one or more processors transmitting the protected NFT to or a burned ledger that stores burned (e.g., deleted, inaccessible, etc.) NFTs. In some arrangements, burning the protected NFT may include the one or more processors transmitting the protected NFT to an un-spendable (e.g., eater, null, inaccessible, etc.) address, where no user and/or device has access to the private key of that particular un-spendable address. Accordingly, the protected NFT would be un-spendable and un-exchangeable.

In some arrangements, the at least one burning attribute of the plurality of burning attributes may be based on output of the output of the metadata object by the one or more processors. For example, the at least one burning attribute may include the one or more processors outputting at least a portion of the output of the metadata object to the remote device. In another example, the at least one burning attribute may include the one or more processors outputting an entirety of the output of the metadata object to the remote device. In some arrangements, the at least one burning attribute may be based on a change to the at least one outputting attribute by the one or more processors. For example, the at least one burning attribute may include the at least on outputting attribute being changed by the one or more processors. In another example, the at least one burning attribute may include the one or more processors receiving an attribute change request to change the one or more of the plurality of outputting attributes.

In some arrangements, the plurality of attributes of the metadata object of the protected NFT may further include a plurality of minting attributes for minting a new protected NFT. In some arrangements, minting may include the one or more processors generating a new metadata object. The new metadata object may include new metadata of the exchange and a plurality of new outputting attributes for outputting. The one or more processors may generate, based on the new metadata object, a new protected NFT that includes a new link with the new metadata object. The new protected NFT may be encapsulated within a new control structure that restricts an output of the new metadata object to the remote device. The one or more processors may sign the new protected NFT using at least one of the first private key or the second public key and transmit the signed new protected NFT to the remote device.

In some arrangements, the one or more processors mint the new protected NFT in response to burning the protected NFT. For example, if the customer and/or the provider request from the one or more processors to change one or more of the plurality of attributes, and the protected NFT is locked such that the plurality of attributes of the metadata object of the protected NFT cannot be changed, the one or more processors may burn the protected NFT and mint the new protected NFT including the changed one or more of the plurality of attributes. In some arrangements, the one or more processors are configured to detect, by the control structure, at least one minting attribute of the plurality of minting attributes is satisfied based on the off-chain data. In response to detecting the at least one minting attribute is satisfied, the one or more processors may mint the new protected NFT. In some arrangements, the at least one minting attribute includes burning the protected NFT. In some arrangements, the at least one minting attribute may be associated with the at least one burning attribute. In some examples, the at least one minting attribute is satisfied in response to the at least one burning attribute being satisfied.

In some arrangements, the plurality of attributes of the metadata object of the protected NFT may further include a plurality of output reversing attributes for reversing output of the metadata object. In some arrangements, outputting the at least the portion of the output of the metadata object to the remote device by the one or more processors includes transmitting the at least the portion of the output of the metadata object to a shared digital wallet of the remote device. In some examples, the shared digital wallet is accessible by the remote device and the data processing system 102 (e.g., the one or more processors, etc.). For example, the one or more processors may have access to the private key(s) of the shared digital wallet. In some arrangements, the one or more processors may detect, by the control structure, that at least one output reversing attribute of the plurality of output reversing attributes is satisfied based on the off-chain data. In response to detecting the at least one output reversing attribute is satisfied, the one or more processors may retrieve the at least the portion of the output of the metadata object from the shared digital wallet. In some arrangements, the at least the portion of the output of the metadata object remains in the shared digital wallet for a predetermined period of time. In response to the predetermined period of time expiring, the one or more processors may transfer the at least the portion of the output of the metadata object to a private digital wallet accessible via the remote device.

In some arrangements, the one or more processors may transfer the protected NFT across networks. For example, the protected NFT may be stored on a first blockchain network. The one or more processors may be configured to receive a network transfer request to transfer the protected NFT to a second blockchain network. In response to receiving the network transfer request, the one or more processors may transfer the protected NFT from the first blockchain network to the second blockchain network. In some arrangements, transferring may include the one or more processors receiving a signed exchange request signed by the second private key, where the second public and private key pair is associated with the protected NFT on the first blockchain network. The one or more processors may provide the second public key to the second blockchain network based on interfacing with a destination address of the second blockchain network via a first application programming interface (API). The one or more processors may determine from the second blockchain network that the signed exchange request was verified (e.g., via systems on the second blockchain network, a client system 103, a third party, processors, etc.). In response to determining that the signed exchange request was verified, the one or more processors may update the first blockchain network by removing the second public and private key pair. In some arrangements, the first blockchain network is a private (e.g., permissioned, etc.) blockchain and the second blockchain network is a public blockchain, or vice versa. In some arrangements, the first blockchain network is a first private blockchain and the second blockchain network is a second private blockchain. In some examples, the first private blockchain is associated with a first financial institution and the second private blockchain is associated with a second financial institution. In some examples, the first financial institution and the second financial institution are of completely different financial institutions. In other examples, the first financial institution and the second financial institution are of the same general financial institution but of different sectors, countries, units, or the like. Transferring of digital assets across networks performed or executed by the one or more processors, according to various illustrative arrangements, is described in U.S. patent application Ser. No. 17/528,455, filed Nov. 17, 2021, the entirety of which is incorporated by reference herein.

In some arrangements, the one or more processors may lock the protected NFT. Locking the protected NFT prevents access to the protected NFT. In some examples, locking includes the one or more processors transmitting the private key(s) of the protected NFT to a wallet address of a private ledger accessible by the one or more processors. In some arrangements, the one or more processors may unlock the protected NFT. In some examples, unlocking includes the one or more processors transferring the private key(s) of the protected NFT out of the private ledger. In some examples, unlocking includes multi-sig verification that requires the signatures of multiple devices. For example, the multi-sig verification may require a first signature from the remote device and a second signature from the data processing system 102.

In some arrangements, the remote device may verify an issuer of the protected NFT. In some examples, the protected NFT may be associated with an issuer identifier identifying the issuer of the protected NFT. The issuer identifier may be accessible to all devices and systems on the network similar to a public key. In some arrangements, the metadata of the metadata object of the protected NFT may include a recorded issuer identifier identifying the issuer of the protected NFT. In some examples, the recorded issuer identifier may be accessible to select devices and system on the network (e.g., the one or more processors, etc.) similar to a private key. In some arrangements, verification includes generating a Merkle tree (e.g., hash tree, etc.) for the protected NFT. The Merkle tree may identify the recorded issuer identifier. The remote device may compare the recorded issuer identifier to the issuer identifier and verify the issuer of the protected NFT in response to determining that the recorded issuer identifier matches the issuer identifier. The issuer identifier and the recorded issuer identifier may include an entity name, a personnel name, a house address, a business address, a telephone number, an email address, a fax number, a bank identifier code (BIC), an IP address, a MAC address, a serial number, or the like, of the issuer (e.g., issuing bank, buyer, etc.) or issuer system/device (e.g., data processing system 102, client system 103, etc.).

In some arrangements, the protected NFT (e.g., parent NFT) can be fractionalized into a plurality of child protected NFTs (e.g., child NFTs). In some arrangements, the remote device functions as a server accessible by multiple user devices, each user device including a user digital wallet. In some examples, the parent NFT is fractionalized by the remote device or the one or more processors and the child NFTs are divided and transferred to the user digital wallets of the multiple user devices. In some examples, the protected NFT can be fractionalized by the one or more processors in response to determining that the asset of the exchange is supplied by multiple suppliers (e.g., manufacturer, etc.) and/or is transported by multiple carriers. For example, in response to determining that the asset of the exchange is supplied by three suppliers, the one or more processors can fractionalize the protected NFT into three child protected NFTs, where each of the three child protected NFTs is associated with a supply chain of the asset corresponding to one of the three suppliers. In some arrangements, each of the three child protected NFTs is associated with a different supplier. In some examples, in response to determining that the asset of the exchange is transported by two carriers, the one or more processors can fractionalize the protected NFT into two child protected NFTs, where each of the two child protected NFTs is associated with a transportation of the asset corresponding to one of the two carriers. In some arrangements, each of the two child protected NFTs is associated with a different carrier.

In some arrangements, fractionalizing can include (i) dividing the metadata object of the protected NFT into a second metadata object and a third metadata object, (ii) generating, based on the second metadata object, a second NFT including a second link with the second metadata object, wherein the second NFT is encapsulated within a second control structure that restricts a second output of the second metadata object, (iii) generating, based on the third metadata object, a third NFT including a third link with the third metadata object, wherein the third NFT is encapsulated within a third control structure that restricts a third output of the third metadata object, and (iv) updating the NFT storage to include the second NFT at a second address and the third NFT at a third address. The second NFT can output the fractionalized NFT to a first user device to allow a first user of the first user device to fractionally own the protected NFT. The third NFT can output the fractionalized NFT to a second user device to allow a second user of the second user device to fractionally own the protected NFT. The second NFT and the third NFT may correspond to different amounts of output for the output of the metadata object of the protected NFT. The fractionalization of the NFTs by the one or more processors, according to various illustrative arrangements, is described in U.S. patent application Ser. No. 17/948,953, filed Oct. 5, 2022, the entirety of which is incorporated by reference herein.

Figure 6:
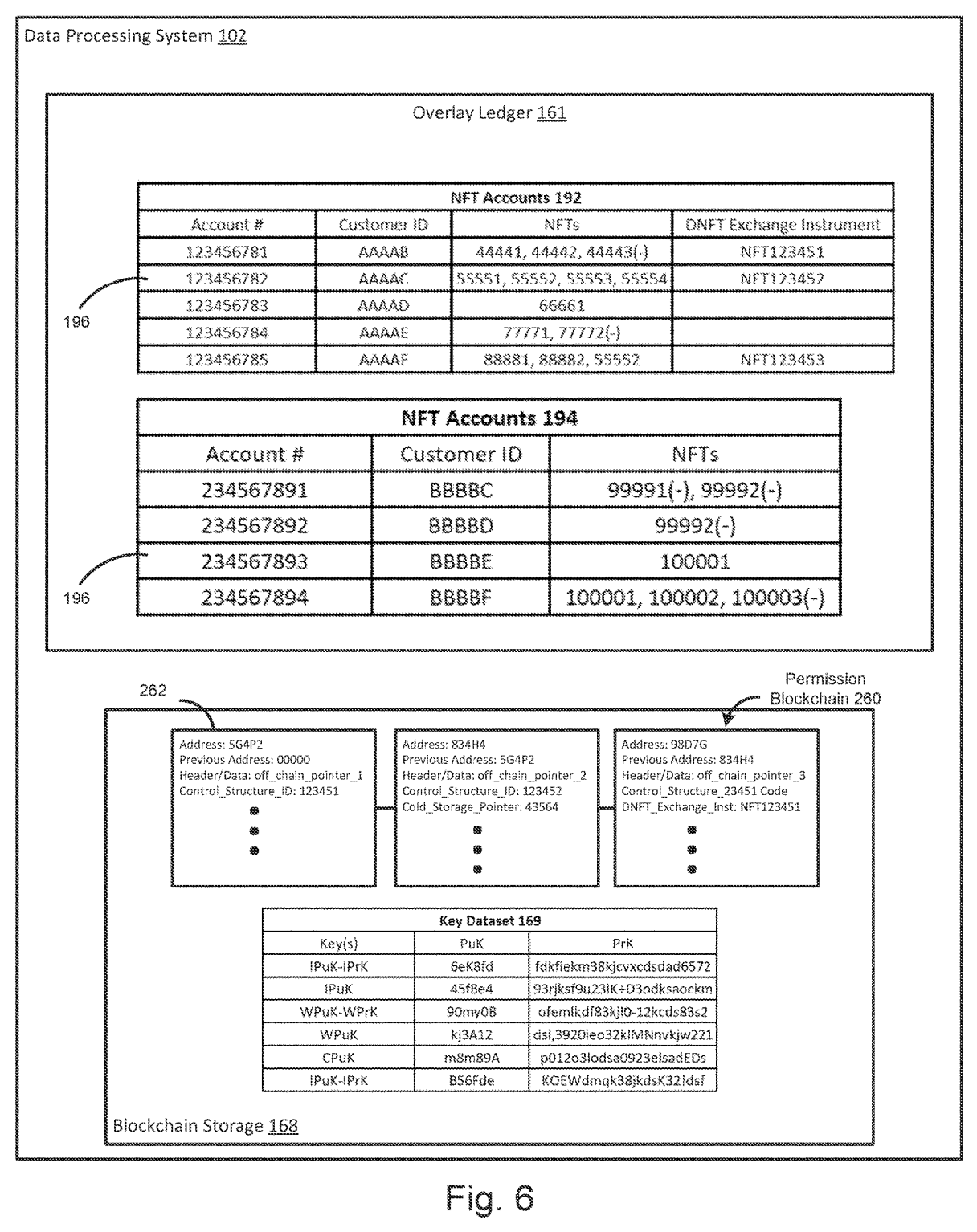

Referring now to FIG. 6, a detailed representation of an overlay ledger 161 and a blockchain storage 168 within the data processing system 102, is shown according to an example arrangement. Token exchange customers (e.g., withdraw, deposit) can be NFT account holders (sometimes referred to herein as "token account holders") with the data processing system 102. In other arrangements, and as described in further detail below, the token exchange customers may be registered with the data processing system 102 prior to engaging in exchanges using the data processing system 102. For example, a deposit of an NFT can be received by the data processing system 102 from a token exchange customer. The deposit received from customer can be maintained and protected by the data processing system 102.

All customer requests (i.e., deposits, withdrawals, updates, issuance, exchange, protection) are received at an NFT transaction processor 250 of the data processing system 102. The NFT transaction processor 250 may communicate directly with client devices (e.g., client system 103) via a network (e.g., network 101). The NFT transaction processor 250 receives requests, token information (e.g., public key information, private key information, hash value, signature information, etc.), deposit information (e.g., metadata of tokens), account information, and the like from token exchange customer. Based on the received information, the NFT transaction processor 250 updates data in the overlay ledger 161. The NFT transaction processor 250 communicates the other received information with a smart contract control structure container 210, a cold storage processor 180, a blockchain storage 168, and a client system 103.

The blockchain storage 168 (and in particular, an NFT smart contract 220) processes exchanges between the customers and the data processing system 102. As discussed above, in an example arrangement, the NFT transaction processor 250 secures the deposited NFT by transferring the NFT to a private key/public key pair owned by the data processing system 102. The blockchain storage 168 initiates these transactions. The exchange may take the form of a direct exchange from the customers wallet (e.g., public address associated with a wallet public key) to in internal address (e.g., hash of an internal public key) in the blockchain storage 168 of the data processing system 102. Accordingly, portions of metadata relating to the deposited NFT (e.g., the private key, the public key, the hash value, NFT value, any associated signatures or hashes, and so on) can be stored in the blockchain storage 168.

Still referring now to FIG. 6, the overlay ledger 161 is a ledger or data storage that associates NFTs with NFT account numbers and customer identifications. The overlay ledger 161 may be split into multiple ledgers. For example, as shown in FIG. 6, the overlay ledger 161 includes a first listing of NFT accounts 192 (e.g., NFT deposit account, NFT savings accounts) and a second listing of NFT accounts 194 (e.g., NFT market accounts, NFT investment accounts, NFT lending, NFT retirement account). In some arrangements, the first listing of NFT accounts 192 may be accounts of the data processing system 102 and the second listing of NFT accounts 194 may be accounts of a different or remote data processing system (e.g., another financial instruction, another NFT exchange system, and so on).

As will be appreciated, the overlay ledger 161 may further be organized according to various types of accounts and subaccounts. Each listing 192 and 194 includes a plurality of entries 196, each relating to a specific account within the data processing system 102. Each listing 196 can include an account number, a customer associated with the account number, and each listing may include one or more NFT identifiers (e.g., a number of NFT identifiers), and one or more DNFT exchange instrument identifiers (e.g., a number of DNFT exchange instrument identifiers), stored on the data processing system 102 of the customer. The customer may be identified by name, another identification (e.g., tax payer identification, social security number, and so on), or a combination thereof. The number of NFTs may express a positive number of NFTs (or portion of NFTs) associated with the NFT account (e.g., the number of NFTs deposited by the customer) or a number of NFTs (or portion of NFTs) owed to the bank (e.g., lent to the customer, used as collateral) (shown with a (–) indicator attached to the NFT identifier in the NFTs column). Additionally, in some arrangements, customers may share NFTs (e.g., 55552) such that each of the NFT accounts may have a record of the NFT. Shared NFTs may be a multi-sig NFT or an single-sig NFT that can be exchanged by any of the NFT accounts. For example, NFT accounts 194 depict two accounts that share the "99992 (–)" NFT, where the NFT may be a digital asset such as a loan and the two accounts may be two people that are married or in a relationship. In another example, NFT accounts 192 depict two accounts that share the "55552" NFT, where the NFT may be a digital asset such as a piece of artwork and the two accounts may be people that purchased the artwork together.

The NFT account holders may have access to the NFT metadata included in the overlay ledger 161 (e.g., via a website associated with the data processing system 102, an application running on a smartphone or tablet, in-person at a location of the data processing system 102, and/or through an ATM associated with the data processing system 102). Although the overlay ledger 161 associates NFTs with individual accounts, the overlay ledger 161 does not associate specific private keys, public keys, and hashes with specific NFT accounts. The number of NFTs listed in the overly ledger 161 is decoupled from the address storing the NFTs deposited and the value of each NFT within the blockchain storage 168. As indicated in FIG. 6, the number of entries listed in the overlay ledger 161 may be much less or much greater than the total amount of addresses (or blocks) storing NFTs on deposit in the blockchain storage 168. For example, the number of entries in the overlay ledger 161 may be for 20 NFT accounts, whereas there may be one block for storing all the NFTs of the plurality of NFT accounts (e.g., the number of entries in the overlay ledger 161 would be greater than the number of blocks storing the NFTs of the NFT accounts). In another example, the number of entries in the overlay ledger 161 may be for 20 NFT accounts, whereas there may be one block for each NFT of the 20 NFT accounts (e.g., the number of entries in the overlay ledger 161 would be less than the number of blocks storing the NFTs of the NFT accounts). As shown, the blockchain storage 168 can also include a permission blockchain 260 with blocks 262 linked with one or more content objects 224, secure NFTs 240, and smart contract control structures 210.

The blockchain storage 168 includes a key dataset 168 that stores the private keys, public keys, hash values, and values of NFTs associated with each private key/public key/hash value group. When the NFT transaction processor 250 receives an NFT from a customer, the information relating to the received NFT (i.e., the private key, the public key, the hash value, an indication of the value of NFT, metadata, control structure, smart contract) can be stored in the blockchain storage 168 including in key dataset 169. When the NFT transaction processor 250 provides an NFT to a customer in a withdrawal, the NFT is ultimately transferred based on the NFT control structure and/or smart contract stored in the blockchain storage 168. After the withdrawal is complete, the overlay ledger 161 is updated to reflect the appropriate changes in ownership of one or more NFTs.

As shown, the blocks 262 of the blockchain storage 168 can include various information such as an address (e.g., public address), a previous address (e.g., pointer to the previous block on the blockchain), a header/data (e.g., including pointers to off-chain metadata of the NFT, metadata of the NFT, smart contract execution code), control structure identifier (e.g., pointer to the control structure restricting the output of the NFT), and/or cold storage pointers (e.g., pointer to a public address on the cold storage ledger 182). Furthermore, as shown, the key dataset 169 can include a plurality of public-private key pairs (PuK-PrK) or individual public keys (PuK), where an "I" leading the PuK or PrK indicates an internal key, "W" leading the PuK or PrK indicates a wallet key, and "C" leading the PuK indicates a cold storage key.

Information contained in the overlay ledger 161 and the blockchain storage 168 are routinely reconciled by the data processing system 102. The reconciliation of the information contained in the overlay ledger 161 and the blockchain storage 168 (as well as other assets of the data processing system 102) that the information contained within the overlay ledger 161 is up-to-date and accurate. The information is reconciled to ensure that the number of assets (e.g., NFTs) on hand is accurate, the number and balance of loans outstanding is accurate, and the value of NFTs associated with individual NFT accounts is accurate. The reconciliation processes may be carried out by the NFT transaction processor 250. The reconciliation process may be performed on a repeating basis (e.g., on a daily basis, on an hourly basis, etc.). The NFT reconciliation process may be performed in conjunction with any reconciliation of other assets of the data processing system 102.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed:

1. A system to protect asset exchanges utilizing non-fungible tokens (NFTs), the system comprising:
a data processing system comprising memory and one or more processors to:
receive a protection request for an exchange;
generate a metadata object comprising metadata of the exchange, a plurality of outputting attributes for outputting an output of the metadata object, and a plurality of output preventing attributes for preventing output;
generate, based on the metadata object, a protected NFT comprising a link with the metadata object, wherein the protected NFT is encapsulated within a control structure that restricts the output of the metadata object to a remote device remote from the one or more processors;
generate a first public and private key pair comprising a first public key and a first private key;
sign the protected NFT using at least one of the first private key or a second public key, wherein the second public key is transmitted to the data processing system by the remote device;
transmit the signed protected NFT to the remote device;
continuously monitor the exchange based on collecting off-chain data from one or more off-chain data feeds;
detect, by the control structure, at least one outputting attribute of the plurality of outputting attributes is satisfied based on the off-chain data;
in response to detecting the at least one outputting attribute is satisfied, output at least a portion of the output of the metadata object to the remote device;
detect, by the control structure, at least one output preventing attribute of the plurality of output preventing attributes is satisfied based on the off-chain data, the at least one output preventing attribute of the plurality of output preventing attributes comprising:

a user identifier of a user of the remote device matching a blacklisted user identifier, the blacklisted user identifier identifying a blacklisted user with a fraudulent exchange history, or a location of the user, determined via a location of the remote device, matching a blacklisted location, the blacklisted location identifying a sanctioned location; and in response to detecting the at least one output preventing attribute is satisfied, prevent outputting the output of the metadata object to the remote device.

2. The system of claim 1, the one or more processors further configured to:

receive, from the remote device, a security token;

compare the security token to a recorded security token stored in the metadata object of the exchange; and in response to the security token matching the recorded security token, authorizing a user of the remote device to access at least a portion of the protected NFT via the remote device, wherein the security token is a security NFT and the recorded security token is a recorded security NFT.

3. The system of claim 1, wherein the protection request for the exchange is received from a customer, via a customer device, in response to the customer exchanging for at least one of services or goods from a provider, the provider being a user of the remote device.

4. The system of claim 1, wherein:

the metadata object further comprises a plurality of burning attributes for burning the protected NFT; and the one or more processors are further configured to:

detect, by the control structure, at least one burning attribute of the plurality of burning attributes is satisfied based on the off-chain data, and in response to detecting the at least one burning attribute is satisfied, retrieve the protected NFT from the remote device and burn the protected NFT, wherein burning the protected NFT comprises transmitting the protected NFT to an un-spendable address of a digital wallet.

5. The system of claim 4, wherein:

the metadata object further comprises a plurality of minting attributes for minting a new protected NFT;

the at least one burning attribute is associated with at least one minting attribute; and the one or more processors are further configured to, in response to burning the protected NFT:

generate a new metadata object comprising new metadata of the exchange and a plurality of new outputting attributes for outputting;

generate, based on the new metadata object, the new protected NFT comprising a new link with the new metadata object, wherein the new protected NFT is encapsulated within a new control structure that restricts an output of the new metadata object to the remote device;

sign the new protected NFT using at least one of the first private key or the second public key; and transmit the signed new protected NFT to the remote device.

6. The system of claim 1, wherein the at least one outputting attribute comprises a period of time passing, wherein the period of time starts in response to transmitting the protected NFT to the remote device.

7. The system of claim 1, wherein the at least one outputting attribute comprises a dynamic attribute, the dynamic attribute configured to change based on at least a portion of the off-chain data, wherein the at least the portion of the off-chain data comprises one or more of weather conditions, trade regulations, pandemics, natural disasters, political unrest, or shipping route disruptions.

8. The system of claim 1, the one or more processors further configured to:

in response to outputting the output of the metadata object to the remote device, receive the protected NFT from the remote device, wherein the remote device is a first remote device associated with a provider; and in response to receiving the protected NFT, transmitting the protected NFT to a second remote device associated with a customer.

9. The system of claim 1, the one or more processors further configured to:

receive the protected NFT from the remote device; and in response to receiving the protected NFT, authorize outputting the output of the metadata object to the remote device.

10. The system of claim 9, wherein:

the metadata object further comprises a plurality of output reversing attributes for reversing output;

outputting the at least the portion of the output of the metadata object to the remote device comprises transmitting the at least the portion of the output of the metadata object to a shared digital wallet of the remote device, the shared digital wallet accessible via the remote device and the data processing system; and the one or more processors are further configured to:

detect, by the control structure, at least one output reversing attribute of the plurality of output reversing attributes is satisfied based on the off-chain data; and in response to detecting the at least one output reversing attribute is satisfied, retrieving the at least the portion of the output of the metadata object from the shared digital wallet.

11. The system of claim 1, wherein:

the protected NFT is stored on a first blockchain network;

the one or more processors are configured to:

receive a network transfer request to transfer the protected NFT to a second blockchain network; and in response to receiving the network transfer request, transfer the protected NFT from the first blockchain network to the second blockchain network; and transferring the protected NFT comprises:

receiving, by the one or more processors, a signed exchange request signed by a second private key, wherein a second public and private key pair comprises the second public key and the second private key, the second public and private key pair being associated with the protected NFT on the first blockchain network;

providing, by the one or more processors to the second blockchain network, the second public key based on interfacing with a destination address of the second blockchain network via a first application programming interface (API);

determining, by the one or more processors from the second blockchain network, the signed exchange request was verified; and in response to determining that the signed exchange request was verified, updating, by the one or more processors, the first blockchain network by removing the second public and private key pair.

12. The system of claim 1, wherein:
the exchange comprises a physical asset; and
each of the plurality of outputting attributes are a geographic location on a proposed route of the physical asset.

13. The system of claim 1, wherein the output of the metadata object comprises a fungible value, and wherein the fungible value is in a form of a digital currency, a digital form of a fiat currency, or a digital financial instrument for exchange.

14. The system of claim 1, wherein:
the at least one outputting attribute comprises at least a portion of a first digital representation of the exchange matching at least a portion of a second digital representation of the exchange;
the first digital representation is at least one of an image, a scannable code, a video, or data received from the remote device; and
the second digital representation is at least one of an image, a scannable code, a video, or data stored in the metadata of the exchange.

15. The system of claim 14, wherein matching the at least the portion of the first digital representation to the at least the portion of the second digital representation comprises analyzing the first digital representation based on collecting one or more content areas of the first digital representation and cross-referencing the one or more content areas with the second digital representation.

16. A method to protect asset exchanges utilizing non-fungible tokens (NFTs), the method comprising:
receiving, by one or more processors, a protection request for an exchange;
generating, by the one or more processors, a metadata object comprising metadata of the exchange, a plurality of outputting attributes for outputting an output of the metadata object, and a plurality of output preventing attributes for preventing output;
generating, by the one or more processors based on the metadata object, a protected NFT comprising a link with the metadata object, wherein the protected NFT is encapsulated within a control structure that restricts the output of the metadata object to a remote device remote from the one or more processors;
generating, by the one or more processors, a first public and private key pair comprising a first public key and a first private key;
signing, by the one or more processors, the protected NFT using at least one of the first private key or a second public key, wherein the second public key is transmitted to the one or more processors by the remote device;
transmitting, by the one or more processors, the signed protected NFT to the remote device;
continuously monitoring, by the one or more processors, the exchange based on collecting off-chain data from one or more off-chain data feeds;
detecting, by the one or more processors using the control structure, at least one outputting attribute of the plurality of outputting attributes is satisfied based on the off-chain data;
in response to detecting the at least one outputting attribute is satisfied, outputting, by the one or more processors, at least a portion of the output of the metadata object to the remote device;
detecting, by the control structure, at least one output preventing attribute of the plurality of output preventing attributes is satisfied based on the off-chain data, the at least one output preventing attribute of the plurality of output preventing attributes comprising:
a user identifier of a user of the remote device matching a blacklisted user identifier, the blacklisted user identifier identifying a blacklisted user with a fraudulent exchange history, or
a location of the user, determined via a location of the remote device, matching a blacklisted location, the blacklisted location identifying a sanctioned location; and
in response to detecting the at least one output preventing attribute is satisfied, preventing, by the one or more processors, outputting the output of the metadata object to the remote device.

17. The method of claim 16, further comprising:
receiving, by the one or more processors from the remote device, a security token;
comparing, by the one or more processors, the security token to a recorded security token stored in the metadata object; and
in response to the security token matching the recorded security token, authorizing, by the one or more processors, a user of the remote device to access at least a portion of the protected NFT via the remote device,
wherein the security token is a security NFT and the recorded security token is a recorded security NFT.

18. A non-transitory computer readable medium including one or more instructions stored thereon and executable by a processor to:
receive a protection request for an exchange;
generate a metadata object comprising metadata of the exchange, a plurality of outputting attributes for outputting an output of the metadata object, and a plurality of output preventing attributes for preventing output;
generate, based on the metadata object, a protected NFT comprising a link with the metadata object, wherein the protected NFT is encapsulated within a control structure that restricts an output of the metadata object to a remote device remote from the processor;
generate a first public and private key pair comprising a first public key and a first private key;
sign the protected NFT using at least one of the first private key or a second public key, wherein the second public key is transmitted to the processor by the remote device;
transmit the signed protected NFT to the remote device;
continuously monitor the exchange based on collecting off-chain data from one or more off-chain data feeds;
detect, by the control structure, at least one outputting attribute of the plurality of outputting attributes is satisfied based on the off-chain data;
in response to detecting the at least one outputting attribute is satisfied, output at least a portion of the output of the metadata object to the remote device;
detect, by the control structure, at least one output preventing attribute of the plurality of output preventing attributes is satisfied based on the off-chain data, the at least one output preventing attribute of the plurality of output preventing attributes comprising:
a user identifier of a user of the remote device matching a blacklisted user identifier, the blacklisted user identifier identifying a blacklisted user with a fraudulent exchange history, or
a location of the user, determined via a location of the remote device, matching a blacklisted location, the blacklisted location identifying a sanctioned location; and in response to detecting the at least one output preventing attribute is satisfied, prevent outputting the output of the metadata object to the remote device.

19. A system to protect asset exchanges utilizing non-fungible tokens (NFTs), the system comprising:
a data processing system comprising memory and one or more processors to:
receive a protection request for an exchange;
generate a metadata object comprising metadata of the exchange, a plurality of outputting attributes for outputting an output of the metadata object, and a plurality of burning attributes for burning the protected NFT;
generate, based on the metadata object, a protected NFT comprising a link with the metadata object, wherein the protected NFT is encapsulated within a control structure that restricts the output of the metadata object to a remote device remote from the one or more processors;
generate a first public and private key pair comprising a first public key and a first private key;
sign the protected NFT using at least one of the first private key or a second public key, wherein the second public key is transmitted to the data processing system by the remote device;
transmit the signed protected NFT to the remote device;
continuously monitor the exchange based on collecting off-chain data from one or more off-chain data feeds;
detect, by the control structure, at least one outputting attribute of the plurality of outputting attributes is satisfied based on the off-chain data;
in response to detecting the at least one outputting attribute is satisfied, output at least a portion of the output of the metadata object to the remote device;
detect, by the control structure, at least one burning attribute of the plurality of burning attributes is satisfied based on the off-chain data; and
in response to detecting the at least one burning attribute is satisfied, retrieve the protected NFT from the remote device and burn the protected NFT, wherein burning the protected NFT comprises transmitting the protected NFT to an un-spendable address of a digital wallet.

20. A method to protect asset exchanges utilizing non-fungible tokens (NFTs), the method comprising:
receiving, by one or more processors, a protection request for an exchange;
generating, by the one or more processors, a metadata object comprising metadata of the exchange, a plurality of outputting attributes for outputting an output of the metadata object, and a plurality of burning attributes for burning the protected NFT;
generating, by the one or more processors based on the metadata object, a protected NFT comprising a link with the metadata object, wherein the protected NFT is encapsulated within a control structure that restricts the output of the metadata object to a remote device remote from the one or more processors;
generating, by the one or more processors, a first public and private key pair comprising a first public key and a first private key;
signing, by the one or more processors, the protected NFT using at least one of the first private key or a second public key, wherein the second public key is transmitted to the one or more processors by the remote device;
transmitting, by the one or more processors, the signed protected NFT to the remote device;
continuously monitoring, by the one or more processors, the exchange based on collecting off-chain data from one or more off-chain data feeds;
detecting, by the one or more processors using the control structure, at least one outputting attribute of the plurality of outputting attributes is satisfied based on the off-chain data;
in response to detecting the at least one outputting attribute is satisfied, outputting, by the one or more processors, at least a portion of the output of the metadata object to the remote device;
detecting, by the control structure, at least one burning attribute of the plurality of burning attributes is satisfied based on the off-chain data; and
in response to detecting the at least one burning attribute is satisfied, retrieving, by the one or more processors, the protected NFT from the remote device and burn the protected NFT, wherein burning the protected NFT comprises transmitting the protected NFT to an un-spendable address of a digital wallet.

21. A non-transitory computer readable medium including one or more instructions stored thereon and executable by a processor to:
receive a protection request for an exchange;
generate a metadata object comprising metadata of the exchange, a plurality of outputting attributes for outputting an output of the metadata object, and a plurality of burning attributes for burning the protected NFT;
generate, based on the metadata object, a protected NFT comprising a link with the metadata object, wherein the protected NFT is encapsulated within a control structure that restricts an output of the metadata object to a remote device remote from the processor;
generate a first public and private key pair comprising a first public key and a first private key;
sign the protected NFT using at least one of the first private key or a second public key, wherein the second public key is transmitted to the processor by the remote device;
transmit the signed protected NFT to the remote device;
continuously monitor the exchange based on collecting off-chain data from one or more off-chain data feeds;
detect, by the control structure, at least one outputting attribute of the plurality of outputting attributes is satisfied based on the off-chain data;
in response to detecting the at least one outputting attribute is satisfied, output at least a portion of the output of the metadata object to the remote device;
detect, by the control structure, at least one burning attribute of the plurality of burning attributes is satisfied based on the off-chain data; and
in response to detecting the at least one burning attribute is satisfied, retrieve the protected NFT from the remote device and burn the protected NFT, wherein burning the protected NFT comprises transmitting the protected NFT to an un-spendable address of a digital wallet.

22. A system to protect asset exchanges utilizing non-fungible tokens (NFTs), the system comprising:
a data processing system comprising memory and one or more processors to:
receive a protection request for an exchange;
generate a metadata object comprising metadata of the exchange, a plurality of outputting attributes for outputting an output of the metadata object, and a plurality of output reversing attributes for reversing output;

generate, based on the metadata object, a protected NFT comprising a link with the metadata object, wherein the protected NFT is encapsulated within a control structure that restricts the output of the metadata object to a remote device remote from the one or more processors;

generate a first public and private key pair comprising a first public key and a first private key;

sign the protected NFT using at least one of the first private key or a second public key, wherein the second public key is transmitted to the data processing system by the remote device;

transmit the signed protected NFT to the remote device;

continuously monitor the exchange based on collecting off-chain data from one or more off-chain data feeds;

detect, by the control structure, at least one outputting attribute of the plurality of outputting attributes is satisfied based on the off-chain data;

in response to detecting the at least one outputting attribute is satisfied, output at least a portion of the output of the metadata object to the remote device, outputting the at least the portion of the output of the metadata object to the remote device comprises transmitting the at least the portion of the output of the metadata object to a shared digital wallet of the remote device, the shared digital wallet accessible via the remote device and the data processing system;

receive the protected NFT from the remote device;

in response to receiving the protected NFT, authorize outputting the output of the metadata object to the remote device;

detect, by the control structure, at least one output reversing attribute of the plurality of output reversing attributes is satisfied based on the off-chain data; and in response to detecting the at least one output reversing attribute is satisfied, retrieve the at least the portion of the output of the metadata object from the shared digital wallet.

23. A method to protect asset exchanges utilizing non-fungible tokens (NFTs), the method comprising:

receiving, by one or more processors, a protection request for an exchange;

generating, by the one or more processors, a metadata object comprising metadata of the exchange, a plurality of outputting attributes for outputting an output of the metadata object, and a plurality of output reversing attributes for reversing output;

generating, by the one or more processors based on the metadata object, a protected NFT comprising a link with the metadata object, wherein the protected NFT is encapsulated within a control structure that restricts the output of the metadata object to a remote device remote from the one or more processors;

generating, by the one or more processors, a first public and private key pair comprising a first public key and a first private key;

signing, by the one or more processors, the protected NFT using at least one of the first private key or a second public key, wherein the second public key is transmitted to the one or more processors by the remote device;

transmitting, by the one or more processors, the signed protected NFT to the remote device;

continuously monitoring, by the one or more processors, the exchange based on collecting off-chain data from one or more off-chain data feeds;

detecting, by the one or more processors using the control structure, at least one outputting attribute of the plurality of outputting attributes is satisfied based on the off-chain data;

in response to detecting the at least one outputting attribute is satisfied, outputting, by the one or more processors, at least a portion of the output of the metadata object to the remote device, outputting the at least the portion of the output of the metadata object to the remote device comprises transmitting the at least the portion of the output of the metadata object to a shared digital wallet of the remote device, the shared digital wallet accessible via the remote device and the data processing system;

receiving the protected NFT from the remote device;

in response to receiving the protected NFT, authorizing outputting the output of the metadata object to the remote device;

detecting, by the control structure, at least one output reversing attribute of the plurality of output reversing attributes is satisfied based on the off-chain data; and in response to detecting the at least one output reversing attribute is satisfied, retrieving the at least the portion of the output of the metadata object from the shared digital wallet.

24. A non-transitory computer readable medium including one or more instructions stored thereon and executable by a processor to:

receive a protection request for an exchange;

generate a metadata object comprising metadata of the exchange, a plurality of outputting attributes for outputting an output of the metadata object, and a plurality of output reversing attributes for reversing output;

generate, based on the metadata object, a protected NFT comprising a link with the metadata object, wherein the protected NFT is encapsulated within a control structure that restricts an output of the metadata object to a remote device remote from the processor;

generate a first public and private key pair comprising a first public key and a first private key;

sign the protected NFT using at least one of the first private key or a second public key, wherein the second public key is transmitted to the processor by the remote device;

transmit the signed protected NFT to the remote device;

continuously monitor the exchange based on collecting off-chain data from one or more off-chain data feeds;

detect, by the control structure, at least one outputting attribute of the plurality of outputting attributes is satisfied based on the off-chain data;

in response to detecting the at least one outputting attribute is satisfied, output at least a portion of the output of the metadata object to the remote device, outputting the at least the portion of the output of the metadata object to the remote device comprises transmitting the at least the portion of the output of the metadata object to a shared digital wallet of the remote device, the shared digital wallet accessible via the remote device and the data processing system;

receive the protected NFT from the remote device;

in response to receiving the protected NFT, authorize outputting the output of the metadata object to the remote device;

detect, by the control structure, at least one output reversing attribute of the plurality of output reversing attributes is satisfied based on the off-chain data; and in response to detecting the at least one output reversing attribute is satisfied, retrieve the at least the portion of the output of the metadata object from the shared digital wallet.

25. A system to protect asset exchanges utilizing non-fungible tokens (NFTs), the system comprising:
a data processing system comprising memory and one or more processors to:
receive a protection request for an exchange;
generate a metadata object comprising metadata of the exchange and a plurality of outputting attributes for outputting an output of the metadata object;
generate, based on the metadata object, a protected NFT comprising a link with the metadata object, wherein the protected NFT is encapsulated within a control structure that restricts the output of the metadata object to a remote device remote from the one or more processors, and wherein the protected NFT is stored on a first blockchain network;
generate a first public and private key pair comprising a first public key and a first private key;
sign the protected NFT using at least one of the first private key or a second public key, wherein the second public key is transmitted to the data processing system by the remote device;
transmit the signed protected NFT to the remote device;
continuously monitor the exchange based on collecting off-chain data from one or more off-chain data feeds;
detect, by the control structure, at least one outputting attribute of the plurality of outputting attributes is satisfied based on the off-chain data;
in response to detecting the at least one outputting attribute is satisfied, output at least a portion of the output of the metadata object to the remote device;
receive a network transfer request to transfer the protected NFT to a second blockchain network; and
in response to receiving the network transfer request, transfer the protected NFT from the first blockchain network to the second blockchain network, wherein transferring the protected NFT comprises:
receiving, by the one or more processors, a signed exchange request signed by a second private key, wherein a second public and private key pair comprises the second public key and the second private key, the second public and private key pair being associated with the protected NFT on the first blockchain network;
providing, by the one or more processors to the second blockchain network, the second public key based on interfacing with a destination address of the second blockchain network via a first application programming interface (API);
determining, by the one or more processors from the second blockchain network, the signed exchange request was verified; and
in response to determining that the signed exchange request was verified,
updating, by the one or more processors, the first blockchain network by removing the second public and private key pair.

26. A method to protect asset exchanges utilizing non-fungible tokens (NFTs), the method comprising:
receiving, by one or more processors, a protection request for an exchange;
generating, by one or more processors, a metadata object comprising metadata of the exchange and a plurality of outputting attributes for outputting an output of the metadata object;
generating, by the one or more processors based on the metadata object, a protected NFT comprising a link with the metadata object, wherein the protected NFT is encapsulated within a control structure that restricts the output of the metadata object to a remote device remote from the one or more processors, and wherein the protected NFT is stored on a first blockchain network;
generating, by the one or more processors, a first public and private key pair comprising a first public key and a first private key;
signing, by the one or more processors, the protected NFT using at least one of the first private key or a second public key, wherein the second public key is transmitted to the one or more processors by the remote device;
transmitting, by the one or more processors, the signed protected NFT to the remote device;
continuously monitoring, by the one or more processors, the exchange based on collecting off-chain data from one or more off-chain data feeds;
detecting, by the one or more processors using the control structure, at least one outputting attribute of the plurality of outputting attributes is satisfied based on the off-chain data;
in response to detecting the at least one outputting attribute is satisfied, outputting, by the one or more processors, at least a portion of the output of the metadata object to the remote device;
receiving a network transfer request to transfer the protected NFT to a second blockchain network; and
in response to receiving the network transfer request, transferring the protected NFT from the first blockchain network to the second blockchain network, wherein transferring the protected NFT comprises:
receiving, by the one or more processors, a signed exchange request signed by a second private key, wherein a second public and private key pair comprises the second public key and the second private key, the second public and private key pair being associated with the protected NFT on the first blockchain network;
providing, by the one or more processors to the second blockchain network, the second public key based on interfacing with a destination address of the second blockchain network via a first application programming interface (API);
determining, by the one or more processors from the second blockchain network, the signed exchange request was verified; and
in response to determining that the signed exchange request was verified, updating, by the one or more processors, the first blockchain network by removing the second public and private key pair.

27. A non-transitory computer readable medium including one or more instructions stored thereon and executable by a processor to:
receive a protection request for an exchange;
generate a metadata object comprising metadata of the exchange and a plurality of outputting attributes for outputting an output of the metadata object;
generate, based on the metadata object, a protected NFT comprising a link with the metadata object, wherein the protected NFT is encapsulated within a control structure that restricts an output of the metadata object to a remote device remote from the processor, and wherein the protected NFT is stored on a first blockchain network;
generate a first public and private key pair comprising a first public key and a first private key;
sign the protected NFT using at least one of the first private key or a second public key, wherein the second public key is transmitted to the processor by the remote device;
transmit the signed protected NFT to the remote device;
continuously monitor the exchange based on collecting off-chain data from one or more off-chain data feeds;
detect, by the control structure, at least one outputting attribute of the plurality of outputting attributes is satisfied based on the off-chain data;
in response to detecting the at least one outputting attribute is satisfied, output at least a portion of the output of the metadata object to the remote device;
receive a network transfer request to transfer the protected NFT to a second blockchain network; and
in response to receiving the network transfer request, transfer the protected NFT from the first blockchain network to the second blockchain network, wherein transferring the protected NFT comprises:
receiving, by the one or more processors, a signed exchange request signed by a second private key, wherein a second public and private key pair comprises the second public key and the second private key, the second public and private key pair being associated with the protected NFT on the first blockchain network;
providing, by the one or more processors to the second blockchain network, the second public key based on interfacing with a destination address of the second blockchain network via a first application programming interface (API);
determining, by the one or more processors from the second blockchain network, the signed exchange request was verified; and
in response to determining that the signed exchange request was verified, updating, by the one or more processors, the first blockchain network by removing the second public and private key pair.

* * * * *